(12) United States Patent
Elliott

(10) Patent No.: US 8,832,917 B1
(45) Date of Patent: Sep. 16, 2014

(54) METHOD FOR ASSEMBLY OF STRUCTURAL SYSTEM

(71) Applicant: Joseph Elliott, Fontana, CA (US)

(72) Inventor: Joseph Elliott, Fontana, CA (US)

(*) Notice: Subject to any disclaimer, the term of this patent is extended or adjusted under 35 U.S.C. 154(b) by 0 days.

(21) Appl. No.: 14/148,451

(22) Filed: Jan. 6, 2014

Related U.S. Application Data

(63) Continuation-in-part of application No. 13/654,693, filed on Oct. 18, 2012, now Pat. No. 8,621,739, and a continuation-in-part of application No. 12/587,868, filed on Oct. 13, 2009, now abandoned.

(60) Provisional application No. 61/196,129, filed on Oct. 14, 2008.

(51) Int. Cl.
B21D 39/03 (2006.01)
B23P 17/00 (2006.01)
E04C 2/42 (2006.01)

(52) U.S. Cl.
CPC ...................................... B23P 17/00 (2013.01)
USPC ................................ 29/428; 52/668; 403/345

(58) Field of Classification Search
CPC .............................. E04H 1/1205; A47D 13/066
USPC ...................... 52/668, 79.9; 29/428; 119/431; 403/345; 108/158.12; 256/24
See application file for complete search history.

(56) References Cited

U.S. PATENT DOCUMENTS

| | | | |
|---|---|---|---|
| 2,481,671 A | 9/1949 | John et al. | |
| 2,632,498 A | 3/1953 | Curtis | |
| 2,832,100 A | 4/1958 | Swallert | |
| 2,854,724 A * | 10/1958 | Wuorio | 249/168 |
| 2,915,040 A | 12/1959 | Ward | |
| 3,066,436 A | 12/1962 | Schuh | |
| 3,069,216 A | 12/1962 | Vaeth | |
| 3,143,236 A | 8/1964 | Haas | |
| 3,195,507 A | 7/1965 | Miller | |
| 3,300,245 A | 1/1967 | Rumble | |
| 3,807,116 A | 4/1974 | Flynn | |
| 4,082,356 A | 4/1978 | Johnson | |
| 4,267,998 A | 5/1981 | Weirich | |
| 4,523,418 A | 6/1985 | McLaughlin | |
| 4,582,002 A | 4/1986 | Wright | |
| 5,076,546 A | 12/1991 | Henry | |
| 5,076,549 A * | 12/1991 | Hashiguchi et al. | 266/107 |
| 5,527,103 A | 6/1996 | Pittman | |
| 5,580,294 A * | 12/1996 | Briant | 446/110 |
| 5,865,660 A * | 2/1999 | Smith | 446/106 |
| 6,174,116 B1 | 1/2001 | Brand | |
| 6,267,065 B1 | 7/2001 | Lin | |
| 6,532,878 B2 | 3/2003 | Tidemann | |
| 6,595,378 B2 | 7/2003 | Wang | |
| 7,108,577 B2 | 9/2006 | Peters et al. | |
| 8,079,315 B2 | 12/2011 | Berent et al. | |
| 8,458,980 B2 * | 6/2013 | Ivanov | 52/668 |
| 2003/0205180 A1 | 11/2003 | Bishop | |
| 2010/0093257 A1 | 4/2010 | Elliott | |

* cited by examiner

Primary Examiner — Jacob Cigna
(74) Attorney, Agent, or Firm — Kenneth L. Green

(57) ABSTRACT

A method for assembly of structural systems comprising structural members with slots, and interior panels. Specific structural members are sequentially interconnected in rigid alignment. A first structural member is positioned with two upward facing slots. Additional structural members are added by engaging downward facing slots of the additional structure members with upward facing slots of the prior structural member. The structural members further include inward reaching spacers which the interior panels are attached to leaving a space between the panels for insulation, wiring, and/or plumbing. The structural members may further include angled slots allowing non-rectangular structures to be constructed.

17 Claims, 23 Drawing Sheets

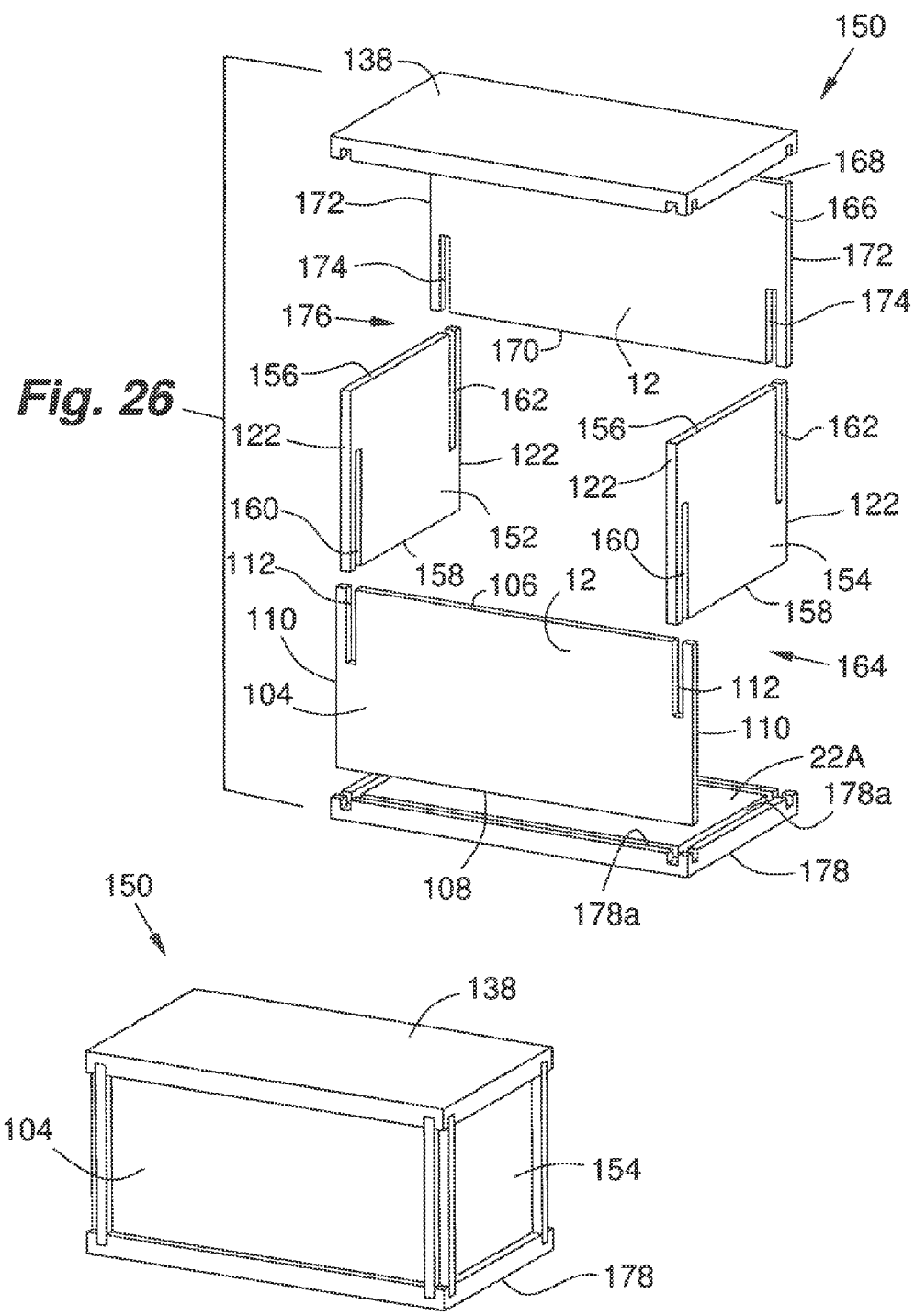

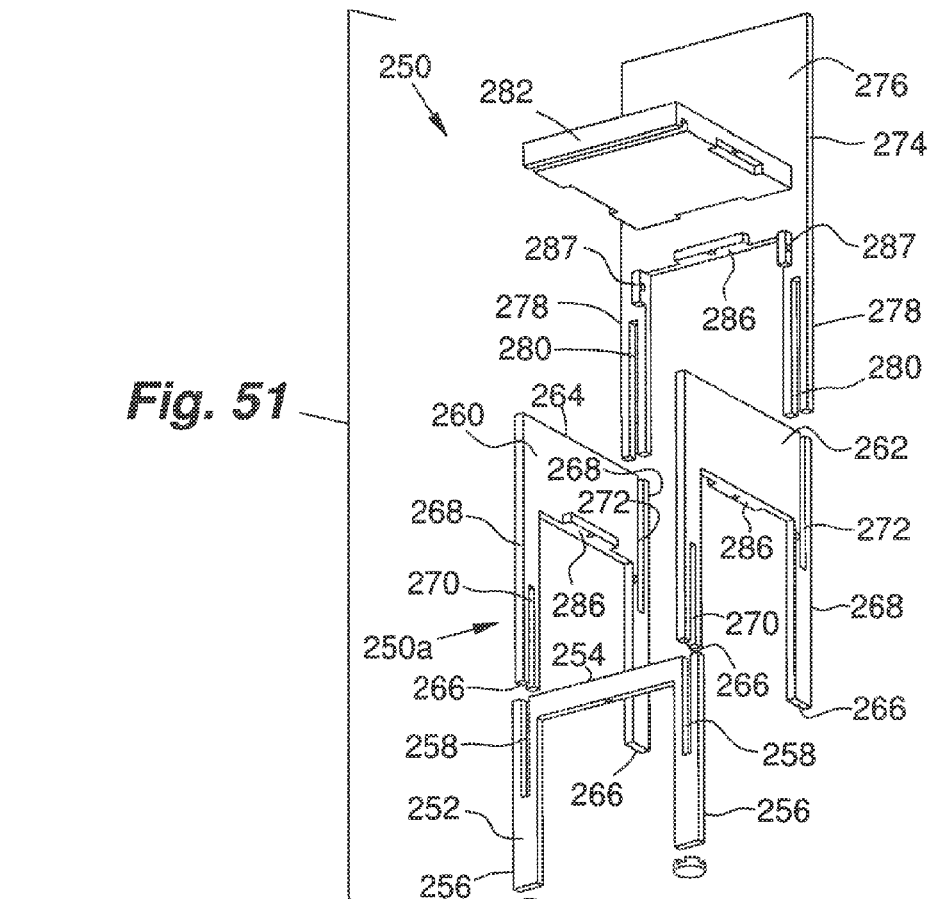
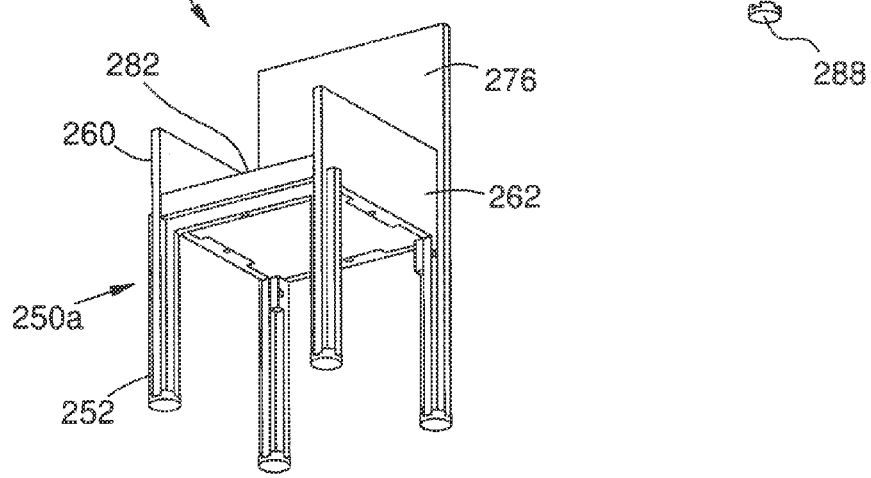

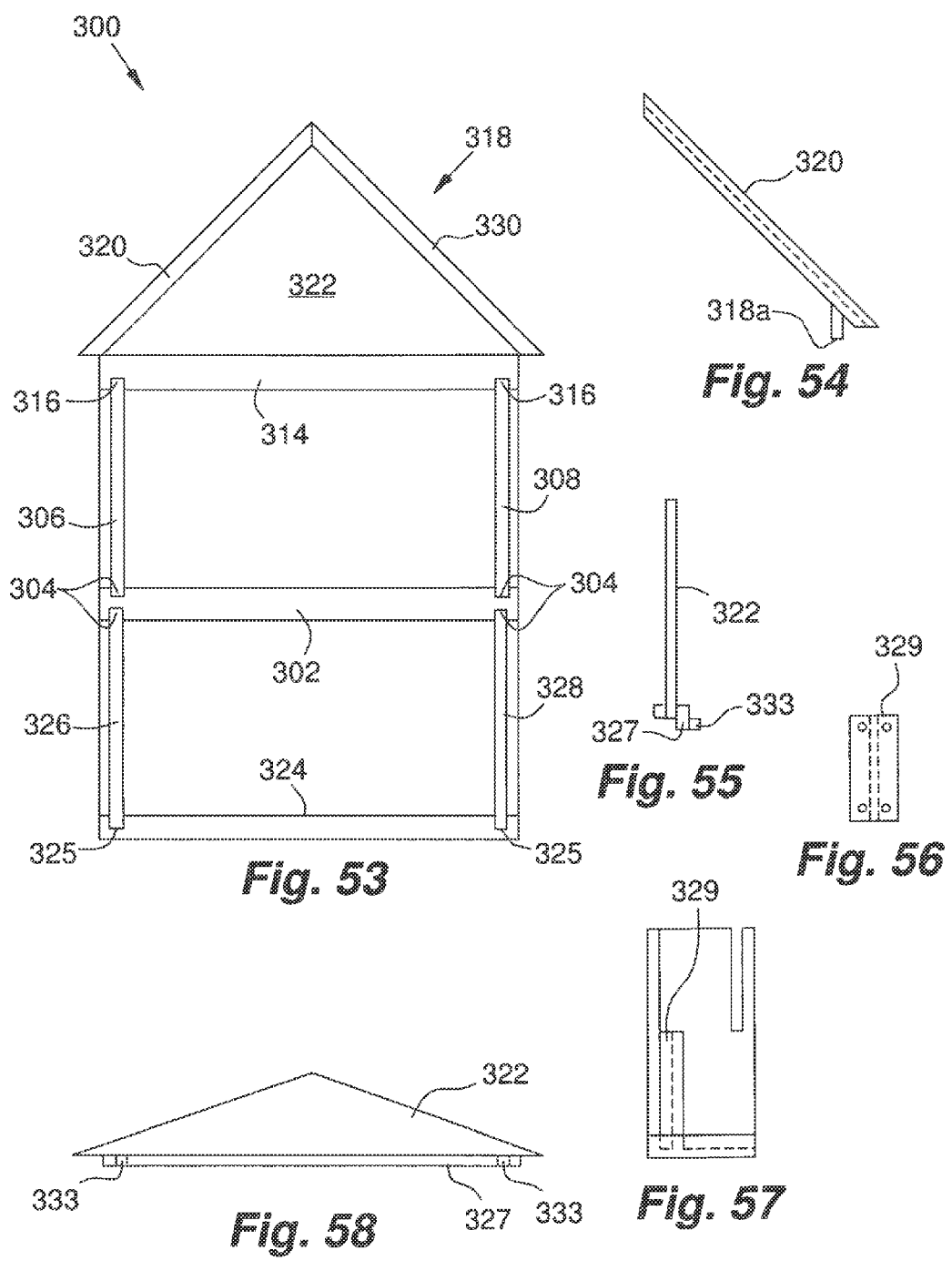

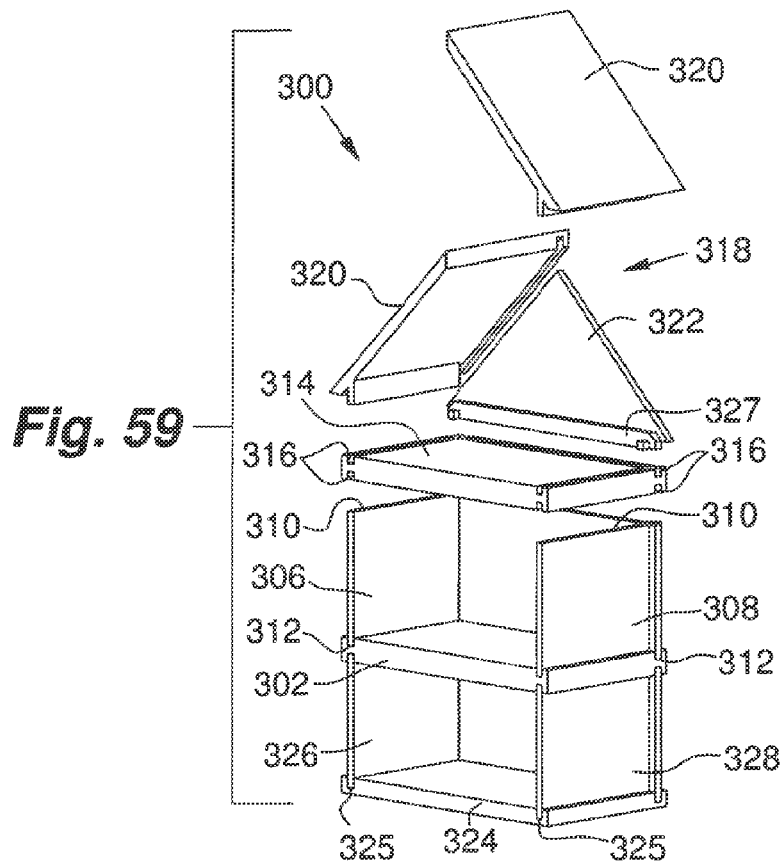
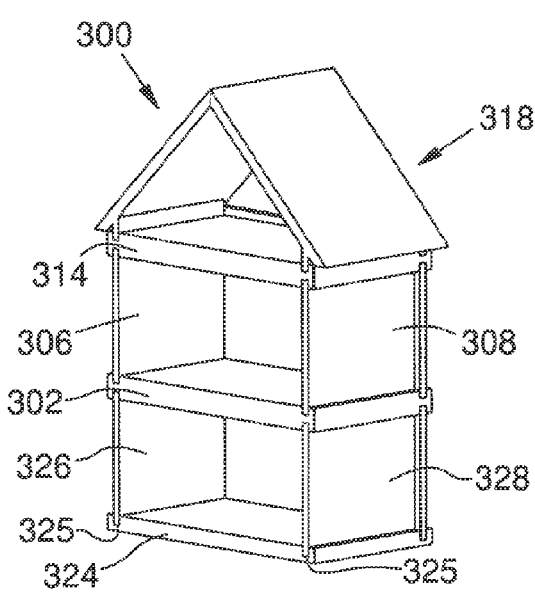

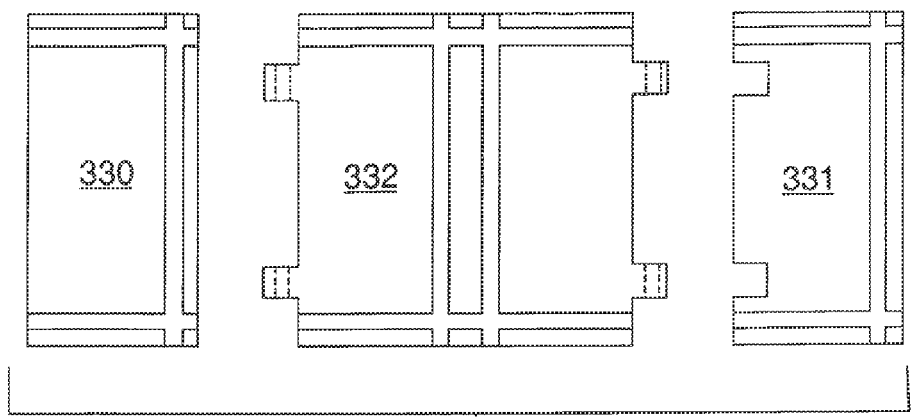
Fig. 61
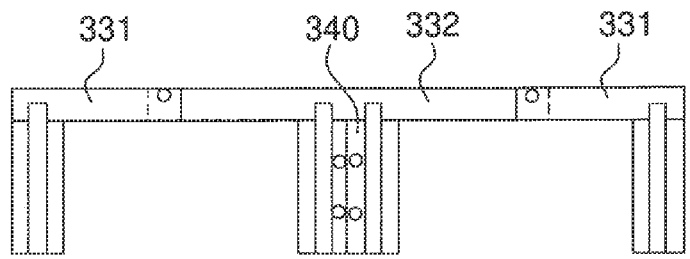
Fig. 62
Fig. 63
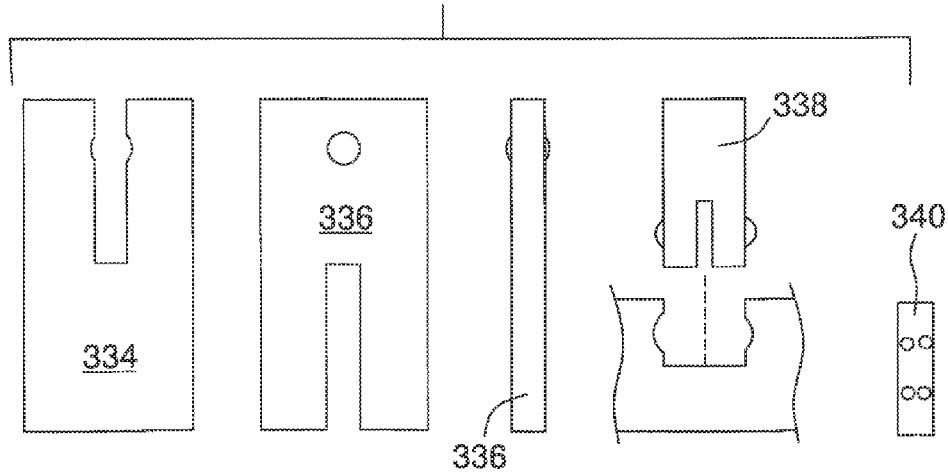

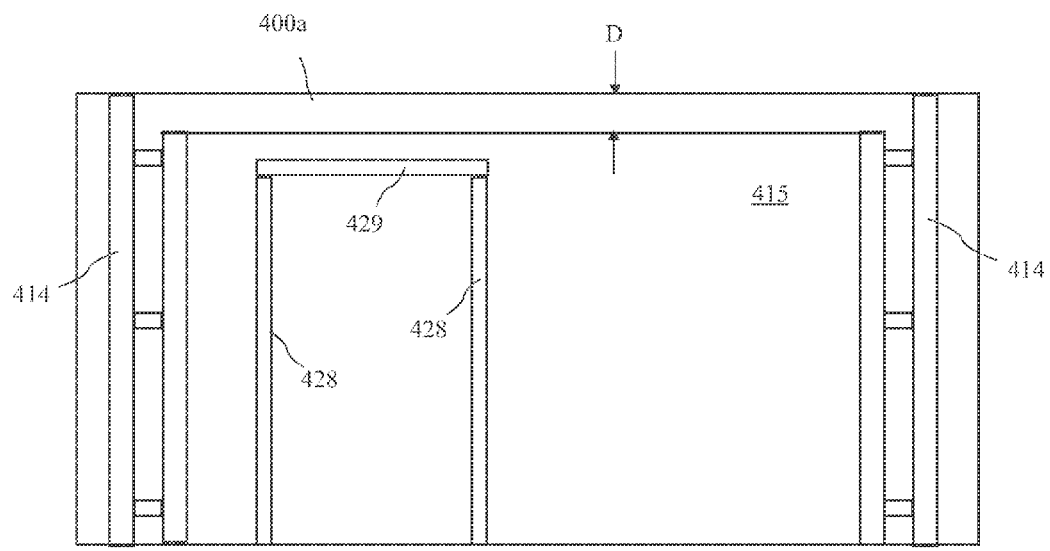
FIG. 80
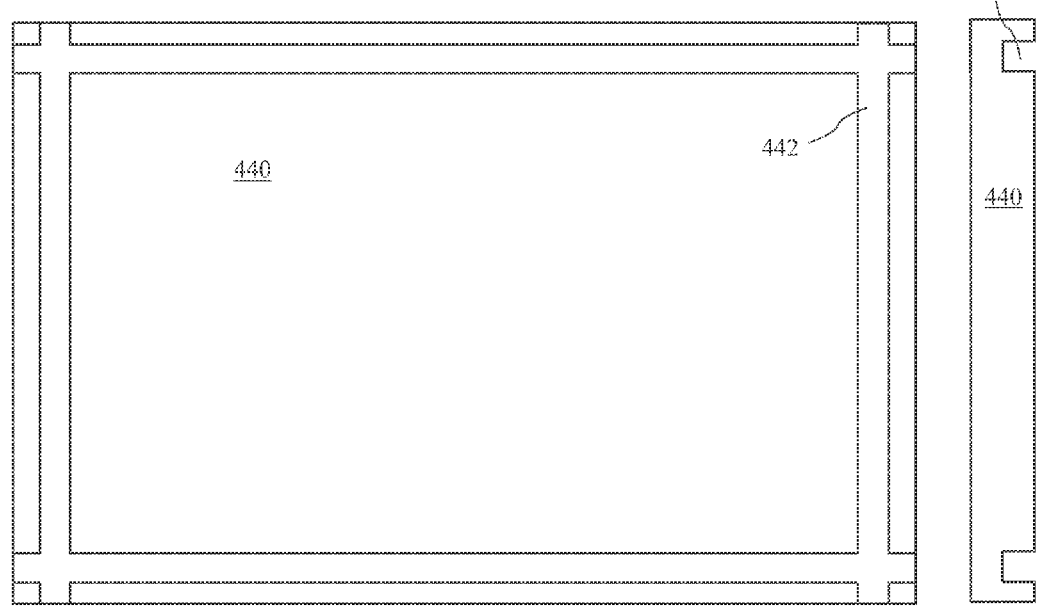
FIG. 81A
FIG. 81B
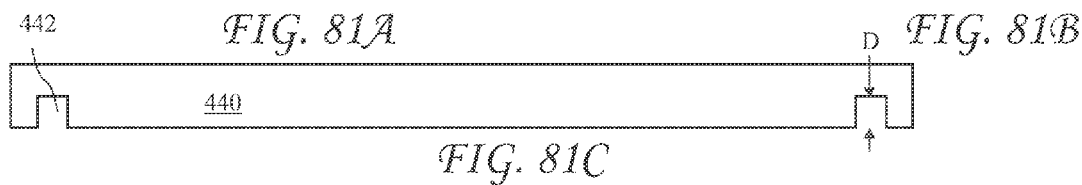
FIG. 81C

METHOD FOR ASSEMBLY OF STRUCTURAL SYSTEM

CROSS-REFERENCE TO RELATED APPLICATIONS

The present application claims the benefit of U.S. Provisional Application No. 61/196,129 filed Oct. 14, 2008, and is a Continuation In Part of U.S. patent application Ser. No. 12/587,868 filed Oct. 13, 2009 and a Continuation In Part of U.S. patent application Ser. No. 13/654,693 filed Oct. 18, 2012, which applications are incorporated in their entirety herein by reference.

BACKGROUND OF THE INVENTION

The present invention relates to the assembly of structures using modular components. More particularly, the invention concerns a method allowing the assembly of structures and objects using planar, interlocking components, by a single individual.

BRIEF SUMMARY OF THE INVENTION

The present invention addresses the above and other needs by providing a method for assembly of structural systems comprising structural members with slots, and interior panels. Specific structural members are sequentially interconnected in rigid alignment. A first structural member is positioned with two upward facing slots. Additional structural members are added by engaging downward facing slots of the additional structure members with upward facing slots of the prior structural member. The structural members further include inward reaching spacers which the interior panels are attached to leaving a space between the panels for insulation, wiring, and/or plumbing. The structural members may further include angled slots allowing non-rectangular structures to be constructed.

In accordance with one aspect of the invention, there are provided embodiments of the present invention allowing for the construction of real or toy chairs, tables, bookshelves, chests, houses, and other structures with internal storage capacity or the ability to support a person or objects. Particular embodiments can be vertically stacked or laterally joined to form extended structures.

In accordance with one aspect of the invention, there are provided design methods and construction techniques using sheets or slabs of any construction material, man-made or natural, to manufacture and assemble many objects and structures. This invention uses closed and open style support, or structural members with interlocking slots inserted into grooves located in bases of various geometrical forms. The closed and open style support members are interchangeable and many bases are also interchangeable. This produces modules which can be stacked vertically and expanded horizontally. All pieces of the modules can have decorative cuts forming their shape as well as decorative cuts and designs on their surfaces producing a large number of objects and structures. These include, for example, a toe protector, furniture, toy furniture, dollhouses, playhouses, walls, floors, ceiling and the roof of a structure.

In accordance with another aspect of the invention, there are provided one or more advantages over prior inventions, including the fact that it is easy to design, manufacture, assemble and disassemble more objects and structures, it allows more styles and sets of furniture, and children can assemble their own toy furniture, doll houses, playhouses, toys, and construction games.

In accordance with still another aspect of the invention, the present invention addresses the fact that the need for extra stability or rigidity in an object is generally determined by the manufacturer and is dependent on parameters which include the precision of cuts for the grooves and slots, the type of material being used, the size of the individual pieces, the weight of the pieces, and the particular application of the structure.

In accordance with another aspect of the invention, there are provided objects, when made in accordance with the present invention, which may not require extra rigidity. These objects may include most tables made of heavy pieces of granite, marble or wood, a toe protector, most children's objects or structures, some structures in some places due to overlying weight or needing flexibility in case of earthquakes, and most objects made of foam.

In accordance with one aspect of the invention, there are provided tables and most chairs constructed in accordance with the present invention which may require fasteners. The fastener of choice in such cases is a thumb screw which is ¼ or one turn, and which is readily available at, for example, local hardware stores or Internet fastener supply sources. The Figures herein show the preferred locations of use. A method of holding children's toys together is also illustrated in the present Figures.

In accordance with still another aspect of the invention, there is provided a ready to assemble toe protector. The toe protector is placed at the foot end of a bed for supporting bed covers above a person's toes. This is important for people with arthritis or injury. It is also useful for a person who paints their toe nails at night and would have to wait an hour for them to dry before retiring; or purchase a heater which cost a lot more than the toe protector. The toe protector can be made from inexpensive stiff foam. It can be assembled and disassembled in less than a minute. Another use of the module is as a desk or as a bookcase, providing that shelves are added to the module. Each module stacked vertically may serve as another shelf in the bookcase. Further, drawers can be added to form a chest of drawers or a desk with drawers.

In accordance with another aspect of the invention, there are provided a storage or toy chest, any kind of table, a footstool, a low work chair, a bench, as a module in a structure, a storage shed, a wall and a floor. The module can also be used as a playhouse for children by increasing the physical dimensions of all pieces and removing the bottom base and providing cut-outs for doors and windows to produce a large outdoor playhouse. A hallway can be assembled to connect two rooms of playhouse by using two structural members inserted into up facing slots of the walls of each room with doorways between the slots. The playhouse can be constructed from thick, soft foam pieces for small children who would enjoy falling into the walls and seeing the house move. Stiff foam and other materials can also be used for older children. They can build their own playhouses and furniture and toys using the simple repeatable assembly techniques illustrated and explained in this disclosure. A large number of toys can be designed and manufactured, especially with the use of injection molding. The outside surfaces of the support members and bases can have the shape of a train locomotive and cars, trucks, etc. The bottom base could have means for attaching wheels. Construction game puzzles are yet another use of this method of design and construction techniques.

In accordance with yet another aspect of the invention, there are provided module bases which can be of any geometrical shape such as, round, rectangular, square, octahedron and triangle shaped. Also, the module bases can have groove patterns of many geometrical shapes.

In accordance with another aspect of the invention, there are provided chairs of various sizes and constructions. A loveseat, settee or bed can also be provided by changing the physical dimensions of the parts of the chairs.

In accordance with still another aspect of the invention, there are provided a dollhouse, playhouse or two story structure of any type for children. The system of the invention can be used to produce very long structures such as seen in European towns. Using the structural members, a model village could be assembled by children. A mobile home could be constructed using some of the methods of this invention which could be assembled on site mostly by unskilled labor and then disassembled if one wished to move the structure.

In accordance with still another aspect of the invention, there is provided a method for sequentially interconnecting the structural members in rigid alignment. The method includes the steps of positioning a first structural member having vertically side by side first and second parallel slots with the first and second parallel slots facing upward, lifting a second structural member having vertically offset third and fourth parallel slots above the first structural member with the third slot facing downward, lowering the second structural member and engaging the third slot of the second structural member with the second slot of the first structural member providing a stable structure, lifting a third structural member having vertically offset fifth and sixth parallel slots above the second structural member with the fifth slot facing downward, lowering the third structural member and engaging the fifth slot of the third structural member with the fourth slot of the second structural member providing a more stable structure, lifting a fourth structural member having vertically side by side seventh and eighth parallel slots above the third structural member with the seventh and eighth slots facing downward, lowering the fourth structural member and at the same time, engaging the seventh slot of the fourth structural member with the sixth slot of the third structural member and engaging the eighth slot of the fourth structural member with the first slot of the first structural member providing a completed stable structure.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 26 is an exploded perspective view of a further structure in accordance with the present invention, which is particularly suitable as a coffee table or other enclosed object;

FIG. 27 is a perspective view of the structure of FIG. 26, in assembled form;

FIG. 51 is an exploded perspective view of a further chair structure in accordance with the present invention incorporating the base of FIG. 47, the support structures of FIGS. 43, 45 and 46 and the attached blocks of FIGS. 49 and 50, and four of the base members of FIG. 12 as feet;

FIG. 52 is a perspective view of the chair structure of FIG. 51, in assembled form;

FIG. 53 is a front view of a two story dollhouse structure in accordance with the present invention;

FIG. 54 is a front view of a roof section of the dollhouse structure depicted in FIG. 53;

FIG. 55 is a side view of a triangle roof piece of the dollhouse structure depicted in FIG. 53;

FIG. 56 is a plan view of a bracket for use in securing adjacent bases and support members of particular structures in accordance with the present invention;

FIG. 57 is a partial side view depicting the intersection of a wall section and a support member secured together with a bracket;

FIG. 58 is a side view of a further base which can be used as a roof in association with a dollhouse structure in accordance with the present invention if an attic is not desired;

FIG. 59 is an exploded perspective view of a dollhouse structure in accordance with the present invention incorporating a triangle roof piece and two roof sections;

FIG. 60 is a perspective view of a dollhouse structure depicted in FIG. 59, in assembled form;

FIG. 61 is a bottom view of three further bases each adapted to be combined with other base portions to form a structure in accordance with the present invention;

FIG. 62 is a front view of a further structure in accordance with the present invention which involves the interconnection of three bases, and a bracket securing adjacent support members together;

FIG. 63 depicts plan views of various groove and support member interface features, each of which is adapted to improve the rigidity of a structure assembled in accordance with the present invention;

FIG. 80 shows a cross-sectional view of one room of the structure constructed using the second structural members and inner panels according to the present invention taken along line 80-80 of FIG. 79;

FIG. 81A shows a bottom view of a grooved roof panel for use with the structure constructed using the second structural members and inner panels according to the present invention;

FIG. 81B shows a side edge view of the grooved roof panel for use with the structure constructed using the second structural members and inner panels according to the present invention;

FIG. 81C shows a front edge view of the grooved roof panel for use with the structure constructed using the second structural members and inner panels according to the present invention;

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

DEFINITIONS

As used herein the following terms mean:

Table: An article of furniture supported by one or more vertical legs and having a flat horizontal surface.

Chair: A piece of furniture consisting of a seat, legs, back, and often arms, designed to accommodate one person.

Desk: A piece of furniture usually with a flat top for writing and drawers or compartments.

Chest: A small closet or cabinet with shelves for storing supplies.

Stool: A backless and armless single seat supported on legs or a pedestal; a low bench or support for the feet or knees in sitting or kneeling, as a footrest.

Figure 24:
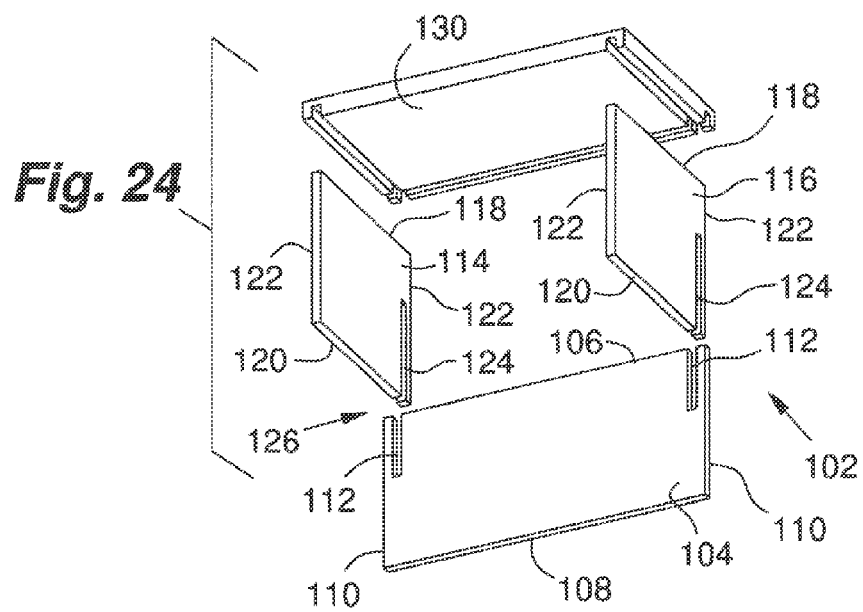
FIG. 24 is an exploded perspective view of a toe protector structure in accordance with the present invention.
Figure 25:
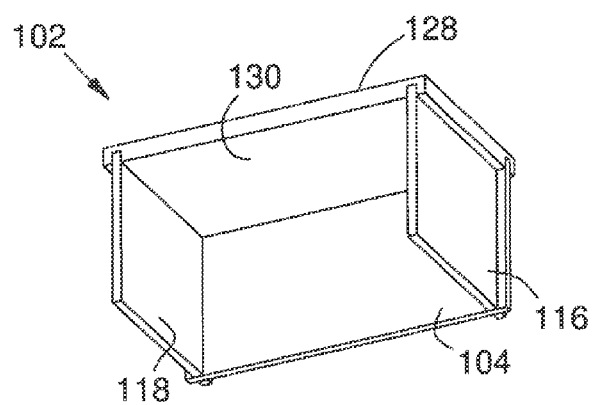
FIG. 25 is a perspective view of the tow protector of FIG. 24, in assembled form.

Referring to the drawings and particularly to FIGS. 1, 3, 7, 8, 24 and 25 one form of the structural furniture system of the present invention is there shown and generally designated in FIGS. 24 and 25 by the numeral 102. This form of the invention and its assembled form can be used for various purposes including a toe protector that can be placed with the front side open at the foot of the bed for supporting bedcovers above a person's toes. This is important for people with arthritis or injury. It is also useful for people who paint their toenails at night and without this device would have to wait a substantial length of time for them to dry before retiring. The toe protector can be made from various materials such as wood, foam and various composites and can be assembled and disassembled in a very short period of time. Another use for this form of the invention is as a desk or as a bookcase.

Figure 7:
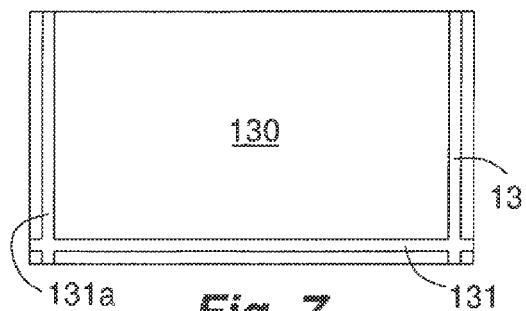
FIG. 7 is a bottom view of a base in accordance with the present invention including two laterally opposed grooves intersecting one longitudinal groove.
Figure 8:
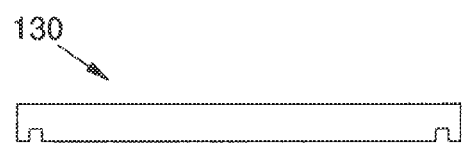
FIG. 8 is a front view of the base of FIG. 7.

In the present form of the invention, the structure identified by the numeral 102 comprises a first generally planar, substantially rectangular member 104 having an upper edge 106, a lower edge 108, spaced apart lateral edges 110 and first slots 112 formed proximate each of the lateral edges 110. Second and third generally planar rectangular members 114 and 116 respectively, which are adapted to be connected to first member 104, have an upper edge 118, a lower edge 120, spaced apart lateral edges 122 and second connector slots 124 formed proximate each of the lateral edges 122. As indicated in FIGS. 24 and 25, second connector slots 124 are uniquely constructed and arranged to mateably engage the first connector slots 112 of first member 104 to join together the first, second and third members to form a first precursor structure 126. Connected to the upper edges 118 and lower edges 120 of the second and third members 114 and 116 to form structure 102 is a generally planar, substantially rectangular top, or fourth member 130. As best seen in FIGS. 7 and 8 of the drawings, member 130 is provided with a plurality of grooves 131 with grooves 131a being constructed and arranged to mateably engage the upper edges of second and third members 114 and 116.

Figure 10:
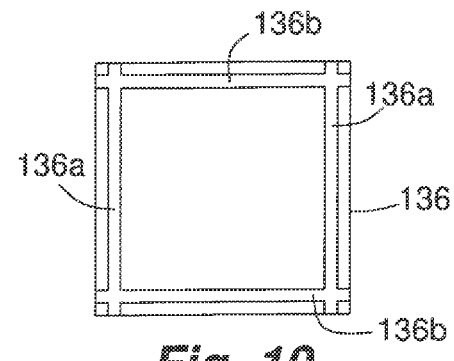
FIG. 10 is a bottom view of another base in accordance with the present invention having two laterally opposed grooves intersecting two longitudinally opposed grooves.
Figure 9:
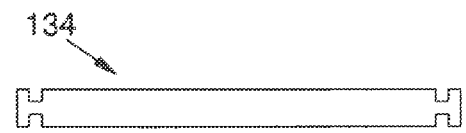
FIG. 9 is a front view of a further base in accordance with the present invention having a similar groove pattern as shown in FIG. 7, but on both the top and bottom faces of the base.
Figure 11:
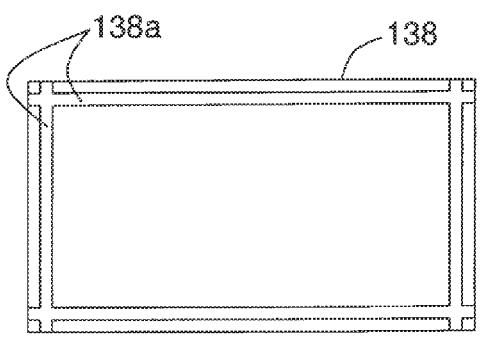
FIG. 11 is a bottom view of a base similar to, but more elongated than the base of FIG. 10.
Figure 12:
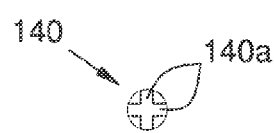
FIG. 12 is a top view of another base in accordance with the present invention having two centrally intersecting grooves, the ends of each groove being exposed laterally.
Figure 14:
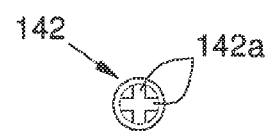
FIG. 14 is a top view of another base in accordance with the present invention having two centrally intersecting grooves, each groove terminating within the base perimeter edge.
Figure 16:
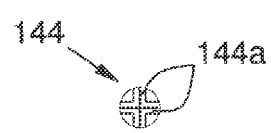
FIG. 16 is a top view of another base in accordance with the present invention similar in configuration to that of FIG. 12, but wherein the centrally intersecting grooves are V shaped to aid in alignment during assembly.
Figure 13:
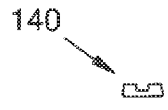
FIG. 13 is a side view of the base shown in FIG. 12.
Figure 15:
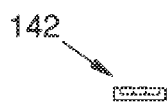
FIG. 15 is a side view of the base shown in FIG. 14.
Figure 17:
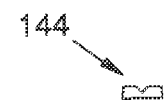
FIG. 17 is a side view of the base shown in FIG. 16.

FIGS. 9 through 17 of the drawings illustrate various alternate forms of top and bottom members of the invention. More particularly, FIG. 9 is a front view of an alternate top member 134 having a similar groove pattern to the top member shown in FIG. 7, but having grooves provided on both the top and bottom faces of the member. Similarly, FIG. 10 is a bottom view of still another top member 136 having two laterally opposed grooves 136a intersecting two longitudinally opposed grooves 136b. In FIG. 11 there is depicted in bottom view yet another top member 138 that is similar to, but more elongated than top member 130. FIG. 12 is a top view of a bottom member 140 having two centrally intersecting grooves 140a, the ends of each groove being exposed laterally. FIG. 13 is a side view of the bottom member shown in FIG. 12. FIG. 14 is a top view of yet another bottom member 142 having two centrally intersecting grooves 142a, each groove terminating within the perimeter of the top member. FIG. 15 is a side view of the bottom member 142. FIG. 16 is a top view of another bottom member 144 that is somewhat similar in configuration to that of FIG. 12, but wherein the centrally intersecting grooves 144a are "V" shaped to aid in alignment during assembly. FIG. 17 is a side view of the bottom member 144.

Turning now to FIGS. 26 and 27, an alternate form of the structural furniture system of the present invention is there shown and generally designated by the numeral 150. This form of the invention is similar in many respects to the system illustrated in FIGS. 24 and 25 and like numerals are used in FIGS. 26 and 27 to identify like components. In its assembled form, furniture system 150 can be used for various purposes including a storage chest, a toy chest, a table, a low work chair, a bench and the like.

Figure 2:
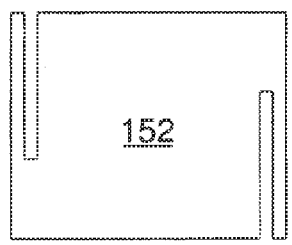
FIG. 2 is a plan view of a further support member in accordance with the present invention including a down facing slot and an up facing slot.

Furniture system 150 here comprises a first generally planar, substantially rectangular member 104 having an upper edge 106, a lower edge 108, spaced apart lateral edges 110 and first slots 112, formed proximate each of the lateral edges 110. Second and third generally planar rectangular members 152 and 154 respectively, which are adapted to be connected to first member 104, have an upper edge 156, a lower edge 158, spaced apart lateral edges 122 and first and second connector slots 160 and 162 formed proximate each of the lateral edges 122 (see also FIG. 2). As indicated in FIGS. 24 and 25, first connector slots 160 are uniquely constructed and arranged to mateably engage the first connector slots 112 of first member 104 to join together the first, second and third members to form a first precursor structure 164. In a manner presently to be described, a fourth, or top member is interconnected with the first precursor structure 164. A generally planar, substantially rectangular fifth, or back member 166 is also adapted to be interconnected with first and second members 152 and 154 in a manner illustrated in FIGS. 26 and 27 of the drawings. Member 166 has an upper edge 168, a lower edge 170, spaced apart lateral edges 172 and downwardly extending slots 174 formed proximate each of the lateral edges 172. As indicated in FIGS. 26 and 27, downwardly extending connector slots 174 are uniquely constructed and arranged to mateably engage the second connector slots 162 of members 152 and 154 to join together member 166 with members 152 and 154 to form a precursor structure 176.

As previously mentioned, a generally planar, substantially rectangular fourth, or top member, such as the top member 138 illustrated in FIG. 11, is connected to the upper edges of members 104, 152, 154 and 166 to form a table, or workbench-like structure. Member 138 is provided with a plurality of grooves 138a that are constructed and arranged to mateably engage the upper edges of members 104, 152, 154 and 166.

Connected to the lower edges of members 104, 152, 154 and 166 to form chest structure 150 is a generally planar, substantially rectangular bottom member 178, which is similar to the member 138 illustrated in FIG. 11. Bottom member 178 is provided with a plurality of grooves 178a that are constructed and arranged to mateably engage the lower edges of members 104, 152, 154 and 166.

Figure 1:
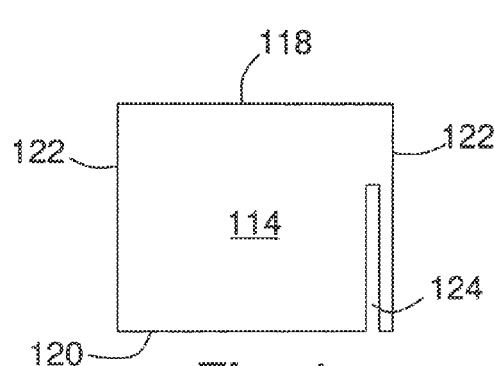
FIG. 1 is a plan view of a support member in accordance with the present invention including a down facing slot.
Figure 4:
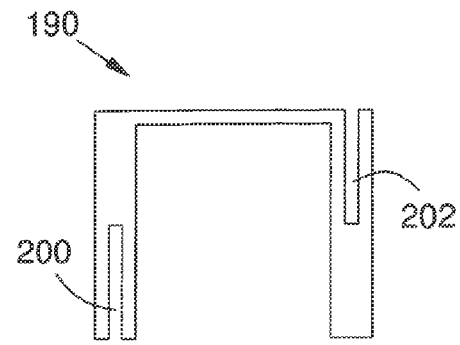
FIG. 4 is a plan view of a further support member in accordance with the present invention including two leg segments, one leg segment having an up facing slot and the other having a down facing slot.
Figure 5:
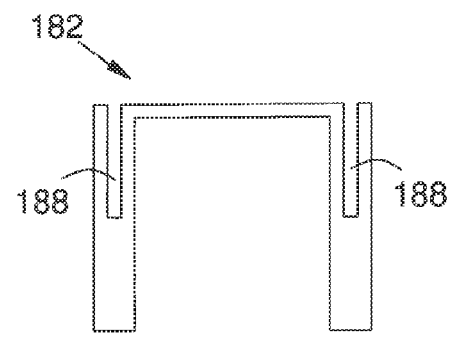
FIG. 5 is a plan view of a further support member in accordance with the present invention including two leg segments, each leg segment having an up facing slot.
Figure 3:
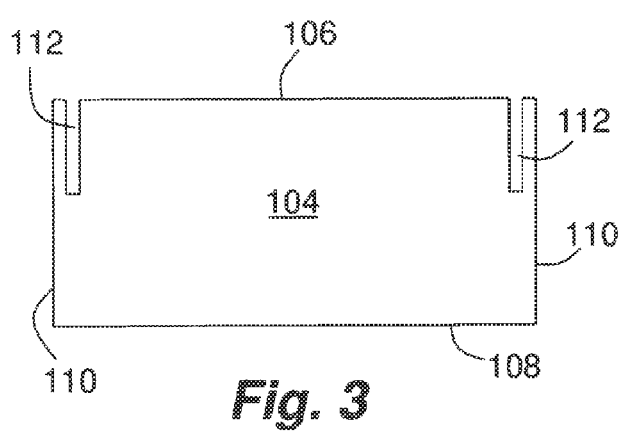
FIG. 3 is a plan view of a further support member in accordance with the present invention including two up facing slots.
Figure 28:
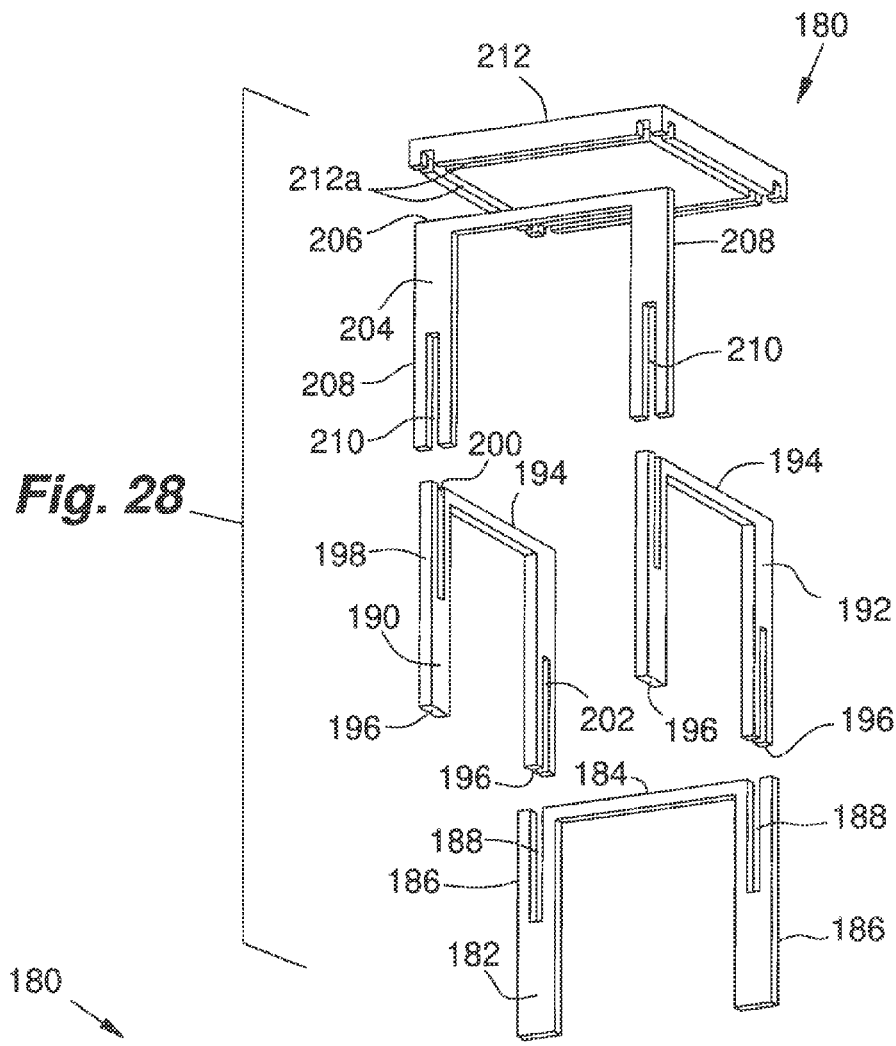
FIG. 28 is an exploded perspective view of a table structure in accordance with the present invention, where the ends of each groove in the base are laterally exposed at the periphery of the base.
Figure 29:
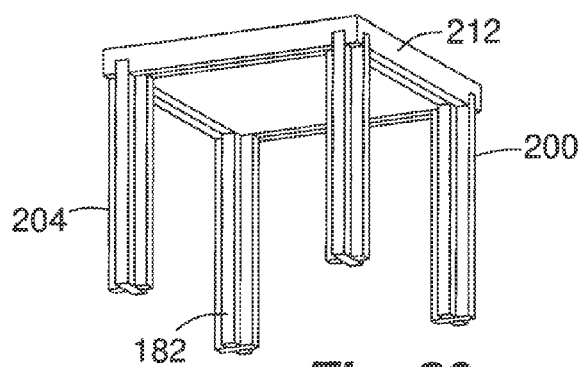
FIG. 29 is a perspective view of the structure of FIG. 28, in assembled form.
Figure 30:
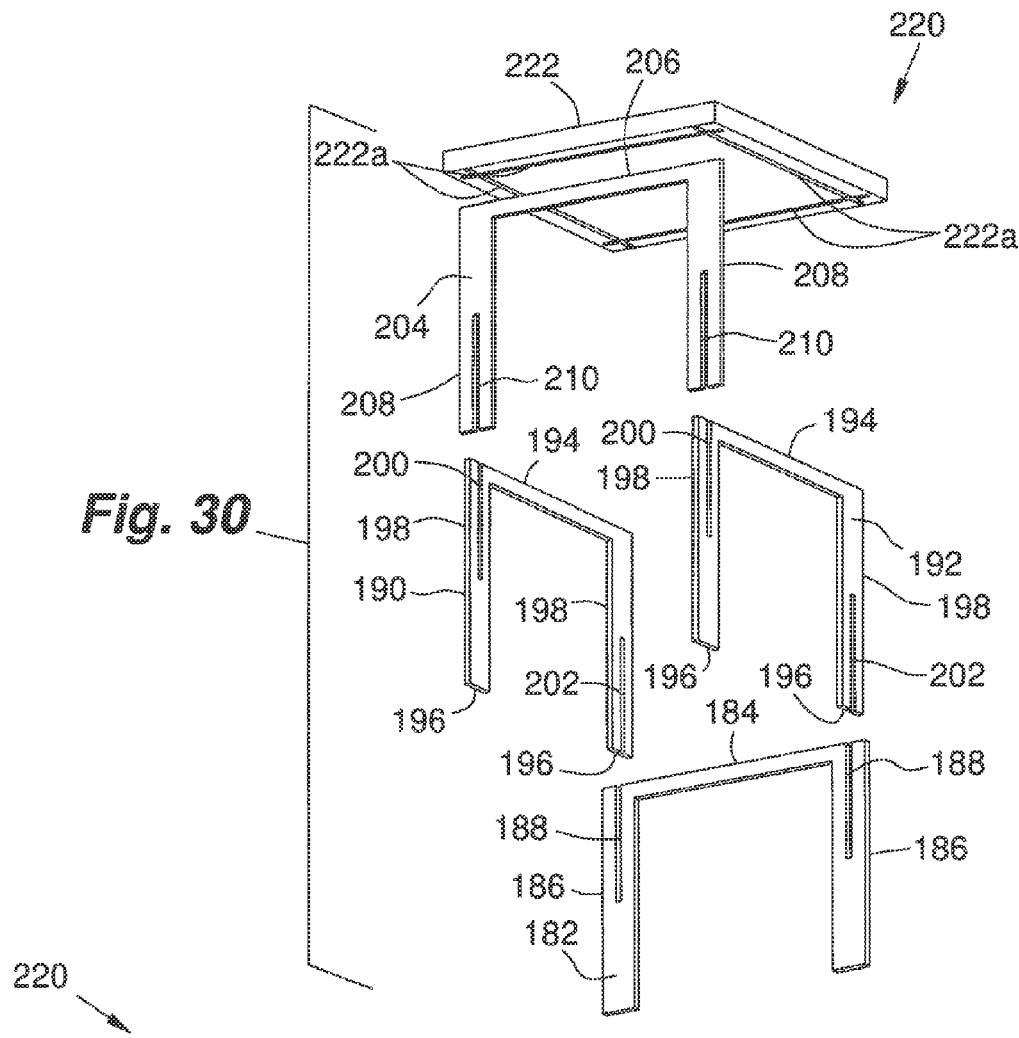
FIG. 30 is an exploded perspective view of a further table structure in accordance with the present invention, where each groove terminates inboard of the base perimeter edge, and is thereby hidden when the structure is viewed laterally.

Turning next to FIGS. 28 and 29 of the drawings, still another form of the structural furniture system of the invention is there shown and generally identified by the numeral 180. Structural furniture system 180 here comprises a table construction that includes a first generally planar "U" shaped member 182 having an upper edge 184, spaced apart lateral edges 186 and first slots 188 formed proximate each of the lateral edges (see also FIG. 5). Furniture system 180 also includes second and third generally planar "U" shaped members 190 and 192 that are adapted to be connected to first member 182. Each of the second and third members 190 and 192 has an upper edge 194, lower edges 196, spaced apart lateral edges 198 and connector slots 200 and 202 formed proximate each of the lateral edges (see also FIG. 4). As indicated in FIG. 30, connector slots 202 are constructed and arranged to mateably engage first connector slots 188 of first member 182 to join together the first, second and third members 182, 190 and 192 to form a first precursor structure. In a manner presently to be described, a fourth, or top member 212 is interconnected with first, second and third members to form a second precursor structure.

Also connected to second and third members 190 and 192 is a "U" shaped fifth member 204. Fifth "U" shaped member 204 has an upper edge 206, spaced apart lateral edges 208 and downwardly extending slots 210 formed proximate each of the lateral edges (see also FIG. 6). As indicated in FIG. 30, connector slots 210 are constructed and arranged to mateably engage connector slots 200 of members 190 and 192 to join together members 190 and 192 and 204.

Figure 67:
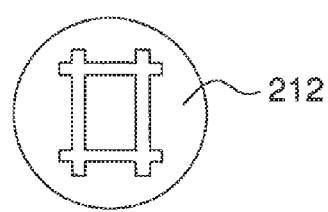
FIG. 67 is a bottom view of a round base in accordance with the present invention, showing how each groove terminates inboard of the base perimeter edge, and is thereby hidden when the structure is viewed laterally.

Connected to the upper edges of members 182, 190, 192 and 204 to form the small end table like structure 180 is the previously mentioned, generally planar, substantially rectangular top, or a fourth member 212. Top member 212 is provided with a plurality of grooves 212a that are constructed and arranged to receive the top edges of members 182, 190, 192 and 204. As illustrated in FIG. 67 of the drawings, top member 212 can be circular as well as various other geometric shapes.

Figure 19:
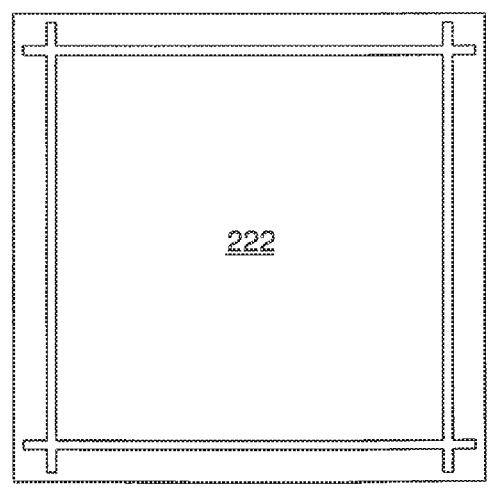
FIG. 19 is another base of the present invention similar to that shown in FIG. 18, but wherein each groove terminates inboard of the base perimeter edge, and is thereby hidden when the structure is viewed laterally.
Figure 31:
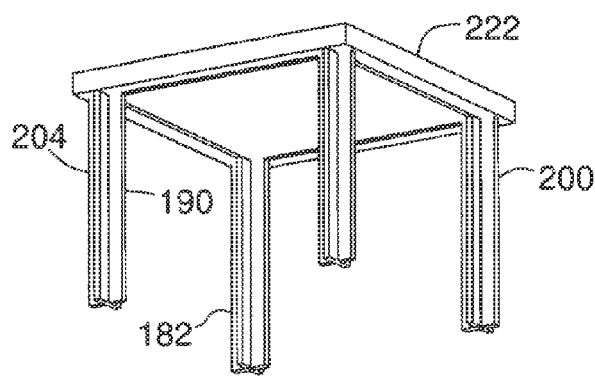
FIG. 31 is a perspective view of the structure of FIG. 30, in assembled form.
Figure 32:
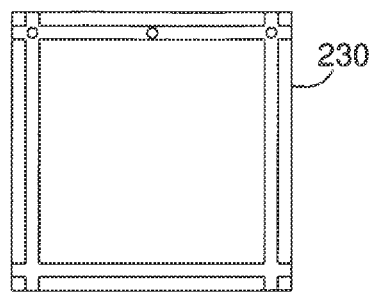
FIG. 32 is a bottom view of a further base which is particularly adapted for use as a component of a chair structure in accordance with the present invention.
Figure 33:
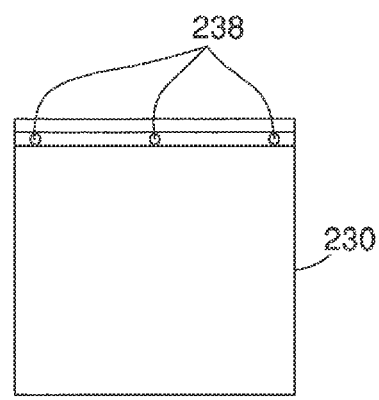
FIG. 33 is a top view of the based shown in FIG. 32.
Figure 34:
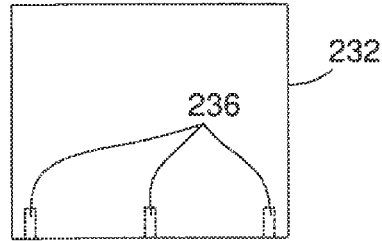
FIG. 34 is a plan view of a further support member which is particularly adapted for use as a chair back component of a chair structure in accordance with the present invention, in association with the base of FIG. 32.

Referring now to FIGS. 30 and 31 of the drawings, yet another form of the structural furniture system of the invention is there shown and generally identified by the numeral 220. Structural furniture system 220, which also comprises a table system, is similar in many respects to the system shown in FIGS. 28 and 29 and like numerals are used in FIGS. 30 and 31 to identify like components. The primary difference between the embodying of the invention shown in FIGS. 28 and 29 and this latest form of the invention resides in the provision of differently configured top member 222. More particularly, top member 222 is provided with a plurality of grooves 222a that terminate inboard of the perimeter of the top member and, accordingly, are hidden when the structure is viewed from the side (see also FIG. 19).

Figure 35:
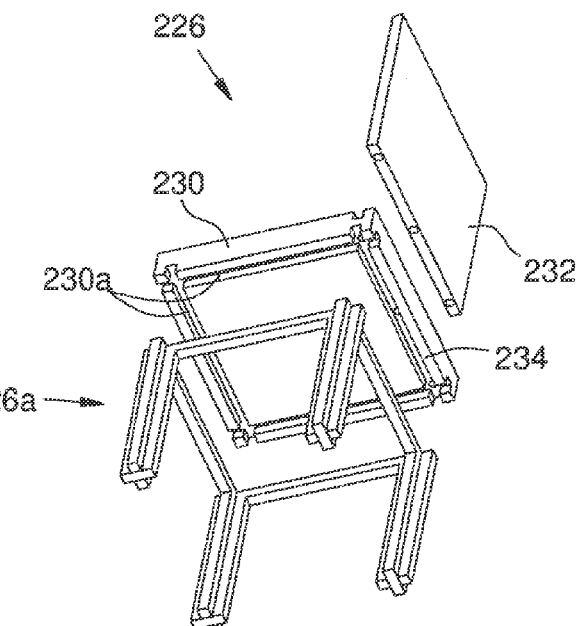
FIG. 35 is an exploded perspective view of a chair structure in accordance with the present invention.
Figure 36:
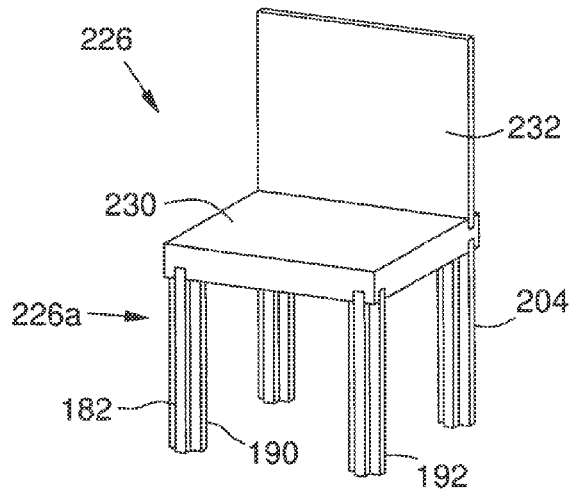
FIG. 36 is a perspective view of the chair structure of FIG. 35, in assembled form.
Figure 37:
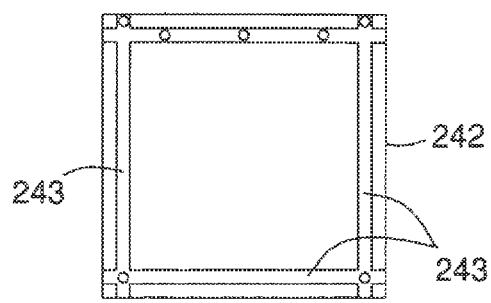
FIG. 37 is a bottom view of a further base which is particularly adapted for use as a component of a chair structure including arm rests in accordance with the present invention.
Figure 38:
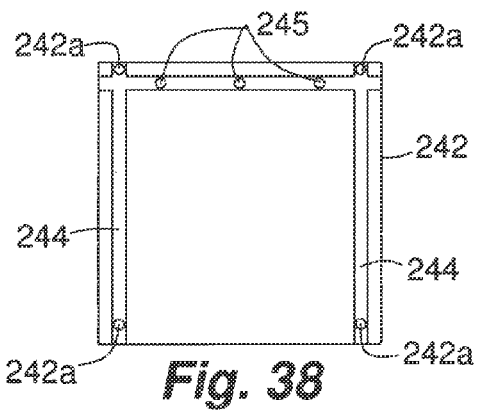
FIG. 38 is a top view of the base shown in FIG. 37.
Figure 39:
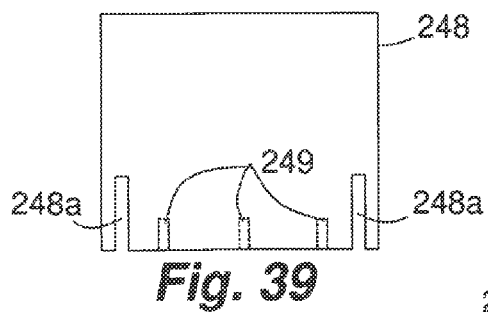
FIG. 39 is a plan view of a further support member which is particularly adapted for use as a chair back component of a chair structure in accordance with the present invention, in association with the base of FIG. 37.
Figure 40:
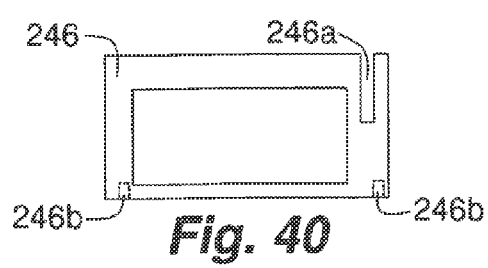
FIG. 40 is a plan view of an arm rest which is particularly adapted for use as a component of a chair structure in accordance with the present invention in association with the base of FIG. 37 and the support structure of FIG. 39.
Figure 41:
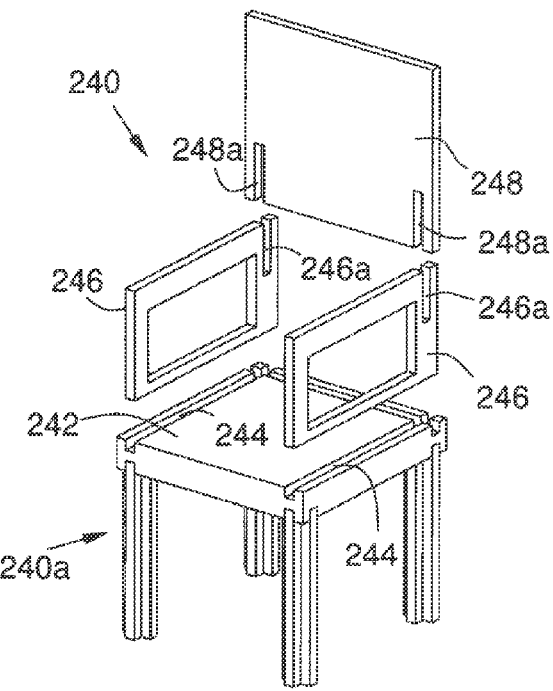
FIG. 41 is an exploded perspective view of a further chair structure in accordance with the present invention incorporating the base of FIG. 37, the support structure of FIG. 39 and the arm rest of FIG. 40.

Turning next to FIGS. 32 through 52, various other forms of the structural furniture system of the invention are there shown. These forms of the structural furniture system, which comprise chairs of several different configurations, function to illustrate the unique flexibility of the system of the invention. As best seen in FIG. 35 of the drawings, seat portion 226a of the chair construction 226 there shown is similar to that of the table construction illustrated in FIGS. 30 and 31 and like numerals are used in FIGS. 35 and 36 identify like components. More particularly, the seat portion 226a of the chair construction shown in FIG. 35 comprises a first generally planar "U" shaped member 182 having an upper edge, spaced apart lateral edges and first slots formed proximate each of the lateral edges (see also FIG. 5). Seat portion 226a also includes second and third generally planar "U" shaped members 190 and 192 that are adapted to be connected to first member 182. Each of the second and third members 190 and 192 has an upper edge, lower edges, spaced apart lateral edges and connector slots formed proximate each of the lateral edges (see also FIG. 4). As earlier discussed, the various connector slots are constructed and arranged so that the first, second and third members 182, 190 and 192 can be readily interconnected to form a first precursor structure.

Figure 6:
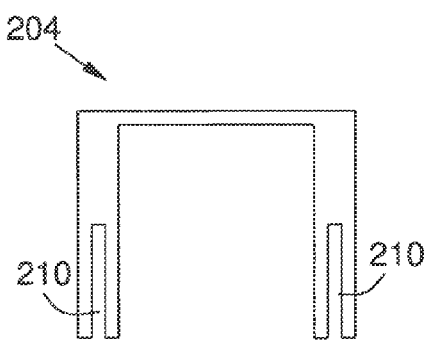
FIG. 6 is a plan view of a further support member in accordance with the present invention, including two leg segments, each leg segment having a down facing slot.

Also connected to second and third members 190 and 192 is a "U" shaped back member 204 having an upper edge, spaced apart lateral edges and downwardly extending slots formed proximate each of the lateral edges (see also FIG. 6). As previously discussed, the various connector slots are constructed and arranged so that members 190 and 192 and 204 can be interconnected to form a second precursor structure.

Connected to the upper edges of members 182, 190, 192 and 204 to form the seat construction 226a is a generally planar substantially rectangular seat, or top member 230. Member 230 is provided with a plurality of grooves 230a that are constructed and arranged to receive the upper edges of members 182, 190, 192 and 204. Connected to the table like, or seat construction 226a to form the chair construction 226 is a back member 232. Back member 232 is received within a groove 234 formed in seat member 230 and is provided with a plurality of transversely spaced apart bores 236, each generally having a threaded insert (not shown). Bores 236 align with a plurality of transversely spaced apart bores 238 formed in member 230 that are adapted to receive complimentary fasteners such as thumb screws (not shown); a function to provide a stable interconnection between member 232 and seat member 230.

Turning next to FIGS. 37 through 42 of the drawings, another form of chair construction of the present invention is there illustrated. This chair construction, which is generally identified as 240 is similar in many respects to the previously described chair construction and includes a seat construction 240a that is made up of the earlier identified members 182, 190, 192 and 204 that are assembled in the manner previously discussed. Affixed to the upper edges of members 182, 190, 192 and 204 is a generally rectangular shaped top, or seat member 242 that is provided on its lower surface with a plurality of grooves 243 (FIG. 37) that receive the upper edges of members 182, 190, 192 and 204. Provided on the upper surface of the seat member is a pair of transversely spaced grooves 244 that are adapted to receive pair of side arm members 246. Each of the side arm members 246 is provided with a slot 246a. Interconnected with side arm members 246 is a back member 248 provided with a pair of transversely spaced slots 248a.

Figure 42:
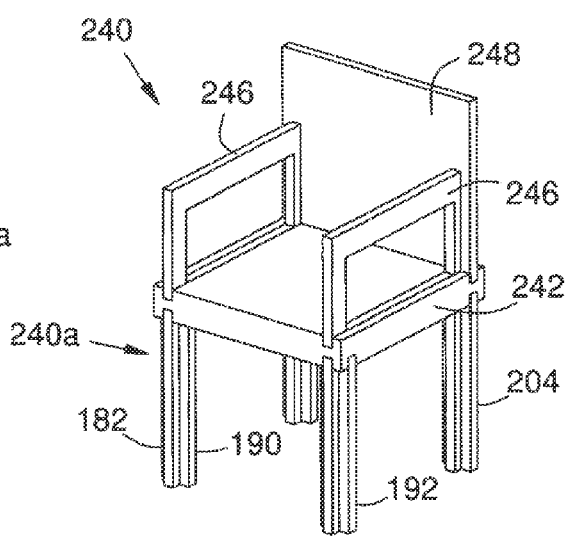
FIG. 42 is a perspective view of the chair structure depicted in FIG. 41, in assembled form.

Slots 248a are constructed and arranged to mateably engage connector slots 246a formed in side arms 246 to form the chair construction illustrated in FIG. 42 of the drawings.

Back member 248 is provided with a plurality of transversely spaced apart bores 249. Bores 249 each generally contain a threaded insert (not shown) and align with a plurality of transversely spaced apart bores 245 formed in member 242 that are adapted to receive complimentary fasteners such as thumb screws (not shown); a function to provide a stable interconnection between member 248 and seat member 242. Similarly, each of the side arms 246 is provided with bores 246b that align with a plurality of spaced apart bores 242a formed in member 242. Bores 242a and bores 246b are adapted to receive dowels or other fasteners (not shown); a function to provide a stable interconnection between members 246 and seat member 242.

Referring to FIGS. 43 through 52 of the drawings, still another form of chair construction of the present invention is there illustrated. This chair construction, which is generally identified in FIGS. 51 and 52 as 250 includes a seat construction 250a that comprises a first generally planar "U" shaped member 252 having an upper edge 254, spaced apart lateral edges 256 and first slots 258 formed proximate each of the lateral edges. Chair construction 250 also includes second and third generally planar "U" shaped members 260 and 262 that are adapted to be connected to first member 252. Each of the second and third members 260 and 262 has an upper edge 264, lower edges 266, spaced apart lateral edges 268 and connector slots 270 and 272, formed proximate each of the lateral edges. As indicated in FIG. 51, connector slots 270 are constructed and arranged to mateably engage first connector slots 258 of first member 252 to join together the first, second and third members 252, 260 and 262 to form a first precursor structure. In a manner presently be described, a fourth, or seat member is interconnected with a first second and third member to form a second precursor structure.

Also connected to second and third members 260 and 262 is a "U" shaped fifth member 274. Fifth "U" shaped member 274 has an upper seat back portion 276 and spaced apart leg portions 278 each having downwardly extending slots 280. As indicated in FIG. 51, connector slots 280 are constructed and arranged to mateably engage connector slots 272 of members 260 and 262 to join together members 260 and 262 and 274.

Connected to members 256, 260, 262 and 274 by presently to be identified connector brackets to form the chair structure 250 is the previously mentioned, generally planar, substantially rectangular seat, or a fourth member 282.

Figure 20A:
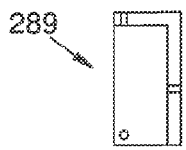
FIG. 20A is a bracket in accordance with the present invention, which may be used along with fasteners to provide additional structural rigidity for a number of structures of the present invention where necessary or desirable.
Figure 20B:
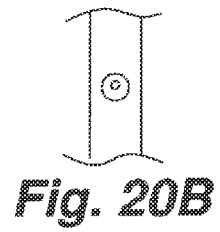
FIG. 20B is a fragmentary enlarged view of a clearance hole within a structure in accordance with the present invention.
Figure 43:
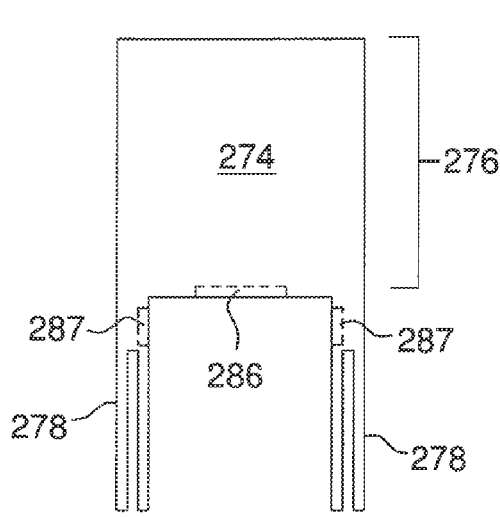
FIG. 43 is a plan view of a further support member with two leg segments, each with down facing slots, and which is particularly adapted for use as a chair back and a portion of two legs of a chair structure in accordance with the present invention.
Figure 44:
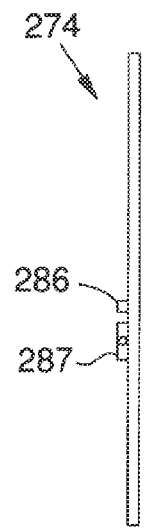
FIG. 44 is a side view of the support member shown in FIG. 43 which also illustrates the assembled positioning of two attached blocks to the support member.
Figure 49:
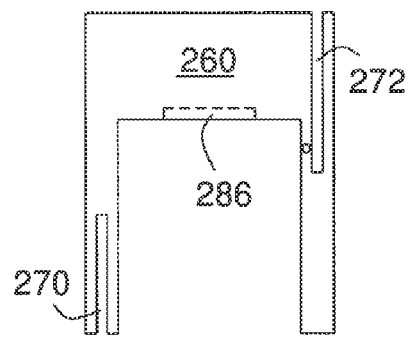
FIG. 49 is a plan view of an attached block with a clearance bore by which support members are secured to a base in particular structures according to the present invention.
Figure 45:
FIG. 45 is a plan view a support structure with two leg segments, one down facing slot and one up facing slot, and which is particularly adapted for use as an arm rest and as a portion of two legs of a chair structure in accordance with the present invention.
Figure 47:
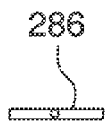
FIG. 47 is a bottom view of a further base which is particularly adapted for use as a component of a chair structure in accordance with the present invention in which component intersections are reinforced using attached blocks and fasteners.
Figure 50:
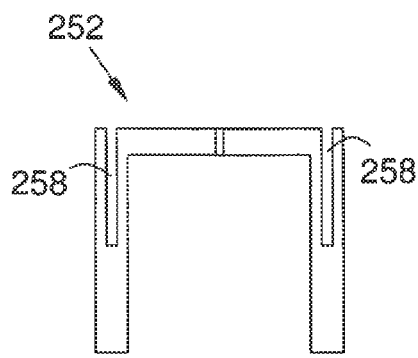
FIG. 50 is a plan view of a further attached block with a clearance bore by which support members are secured to a base in particular structures according to the present invention.
Figure 46:
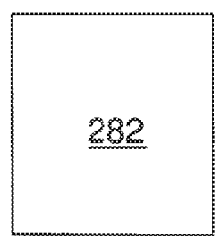
FIG. 46 is a plan view of a further support structure with two leg segments and two up facing slots, and which is particularly adapted for use as a front portion of a chair structure in accordance with the present invention.
Figure 48:
FIG. 48 is a top view of the base of FIG. 47, further depicting four clearance holes to be axially aligned with the holes positioned in respective attached blocks.

To provide attachment points and support for member 282, support blocks 286 and 287 (FIGS. 49 and 50) are affixed to members 260 and 274 at locations indicated in FIGS. 43, 44 and 45 of the drawings. Additionally, as illustrated in the drawings, clearance bores are strategically located to allow conventional fasteners to be used to provide additional structural rigidity for the chair. Threaded inserts can be securely positioned within the bore of one member, for example by press fit or adhesive, such that the member may receive a bolt, a thumb screw, or similar complimentary threaded fastener through the clearance bore associated with an adjoining member, thereby rigidly fastening the two members together. In chair structure 250 (shown in FIGS. 51 and 52), for example, the four bores in member 282 each have such a threaded insert placed within them (not shown), and member 252 and supports blocks 286 and 287 each include a corresponding clearance bore through which a thumb screw fastener (not shown) can be introduced and mated with the respective threaded insert in member 252. FIG. 20A of the drawings illustrates another type of bracket 289 that can be used along with the conventional fasteners to provide additional structural rigidity. FIG. 20B is a fragmentary enlarged view of a typical clearance bore. Further, foot bases 288 are affixed to the legs of the chair to provide additional protection for the floor surface upon which the chair will be used. These foot bases can be used in a similar fashion in connection with other structures of the present invention.

Figure 18:
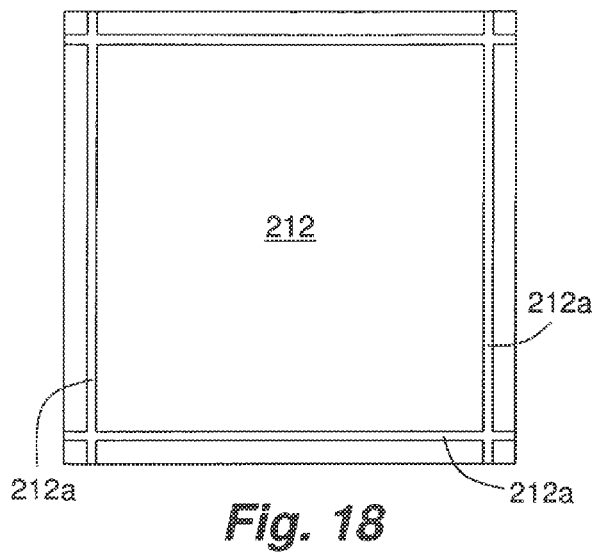
FIG. 18 is another base in accordance with the present invention similar to that shown in FIG. 10, but larger, making it more suitable for tabletop applications.
Figure 21:
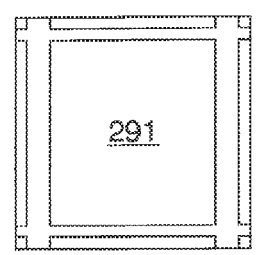
FIG. 21 is a bottom view of a base in accordance with the present invention with a similar groove pattern as the base of FIG. 18, but wherein the two lateral grooves are wider to interface with a thicker structural member.

FIG. 21 is a bottom view of a slightly differently configured seat 291 showing a similar groove pattern to that shown in FIG. 18, but wherein the two lateral grooves are wider to interface with a thicker structural member.

Figure 22:
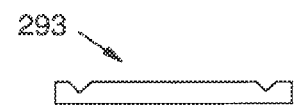
FIG. 22 is a side view of a base similar to that shown in FIG. 21, but wherein the two lateral grooves are cut in a V shaped pattern to help guide the respective support member into the groove.

FIG. 22 is a side view of a seat 293 similar to that shown in FIG. 21, but wherein the two lateral grooves are cut in a "V" shaped pattern to help guide the respective support member into the groove.

Figure 23:
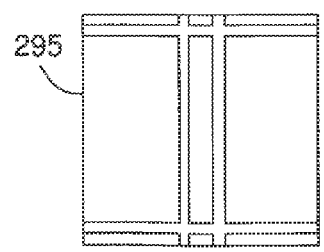
FIG. 23 is a bottom view of another base in accordance with the present invention which is particularly suited to form a center base of a multiple base structure.

FIG. 23 is a bottom view of a base 295 of still a different configuration.

Referring now to FIGS. 53 through 67, still another form of the structural system of the invention is there shown and generally designated in FIGS. 59 and 60 by the numeral 300. Structural system 300, which is in the form of a doll house, comprises a first floor member 302 having a plurality of spaced apart grooves 304 and first and second spaced apart side members 306 and 308 that are connected to the first floor member 302 in the manner shown in the drawings. As shown in FIG. 59, first and second side members 306 and 308 each have an upper edge 310 and a lower edge 312, the lower edge being received within selected ones of the plurality of spaced apart grooves 304 of the first floor member 302.

Connected to the top edges of the first and second spaced apart side members 306 and 308 is a ceiling member 314 having a plurality of spaced apart grooves 316 (FIG. 59). As illustrated in FIGS. 53 and 63, the upper edges of the side members are received within selected ones of the grooves 316 formed in ceiling member 314.

Connected to ceiling member 314 is a slanted roof structure 318 having edges 318a receivable within selected ones of the grooves 316 formed in the ceiling member. Slanted roof structure 318 comprises interconnected side panels 320 and an end panel 322 that is interconnected with the side panels and with the ceiling member 314. End panel 322 includes a long edge piece 327 which is receivable by a groove in ceiling member 314, and two short edge pieces 333 which are receivable by two opposing grooves in ceiling member 314 (see FIGS. 55, 58 and 59).

As illustrated in FIG. 59, structural system 300 further includes a second floor member 324 having a plurality of grooves 325 and third and fourth side members 326 and 328. Side members are connected to and disposed between the first and second floor members in a manner illustrated in the drawings.

FIG. 56 is a plan view of a bracket 329 for use in securing adjacent structural members of particular structures in accordance with the present invention.

FIG. 57 is a partial side view depicting the intersection of a typical wall section and a typical structural member secured together with a bracket.

Figure 64:
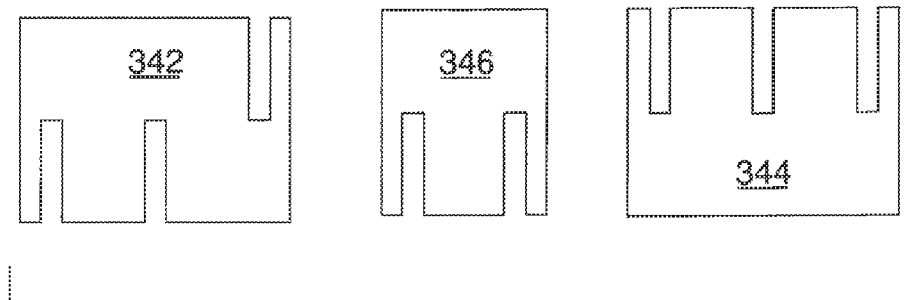
FIG. 64 depicts three further support members with slots in accordance with the present invention.
Figure 65:
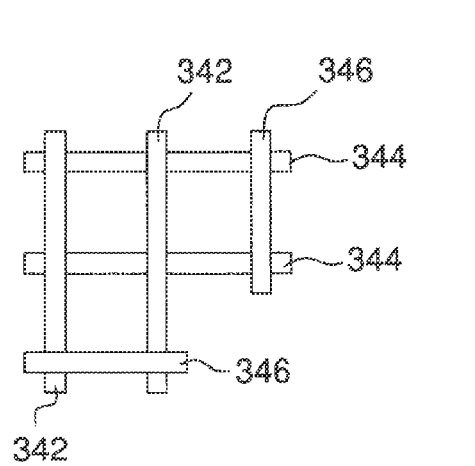
FIG. 65 is a top view of a further structure in accordance with the present invention, and incorporating the support members depicted in FIG. 64.
Figure 66:
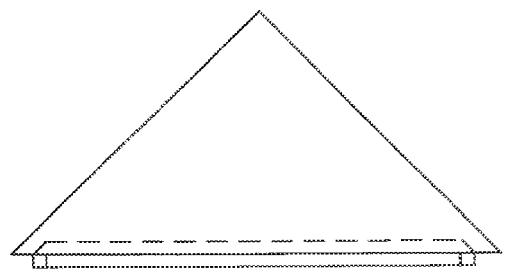
FIG. 66 is a plan view of the triangular roof structure depicted in FIG. 55.

FIGS. 61 and 62 illustrate various ways in which the various structural members of the present invention can be laterally interconnected to expand the length and width of a given structure as may desired for a particular application. For example, base 332 can be joined between two bases 331, and base 295 (shown in FIG. 23) can be joined between two bases 330. For example, such bases can be fastened together rigidly or semi-rigidly using the previously-mention threaded inserts in association with base 332 at positions indicated in FIG. 61 by dotted lines. When base 332 and 331 are mated, the joint may be secured by way of a bolt, thumb screw or other complimentary threaded fastener placed through a bore located in each of the two opposing lateral sides of base 331 in axial alignment with the threaded inserts of base 332. Ultimately, placement of support members into the respective grooves of the bases will also contribute to maintaining the interconnection of the bases. Bracket 340 can also be used to provide additional structural rigidity when needed. FIGS. 64 and 65 illustrate how the support members 342, 344, and 346 can be used to create multi-room or multi-cell structures.

The material used for manufacture of the structural members of the present invention can be anything from plastic to metal. Items 334 and 336 represent the interlocking slots of two structural members. The curved area of item 334 rides up over and centers on top of the raised area on item 336. The curved area of item 334 can be formed by drilling a hole before cutting the slot. The raised area of item 336 could be the head of a pin or a small smooth rivet. Item 338 represents the edge of a support member which is inserted into a groove of a base. Item 338 has four rivets, two on each end near the two ends of the support member. Two holes are drilled in each end of the base before the groove is cut. The amount of rigidity obtained is dependent on the thickness of the support members, the size of the rivets and the mating curvature. Alternatively injection molding could form these areas in the plastic or material. The mating areas could then cover a large area end to end or side to side.

The various structural members can have decorative cuts for their shapes and cuts and designs on the surfaces. By adding drawers to the bookcase, it becomes a chest of drawers. Support members can also feature cut-outs for doors and windows to produce, for example, a large outdoor playhouse.

A hallway can be assembled to connect two rooms of playhouse by using two structural members inserted into up facing slots of the walls of each room with doorways between the slots. The playhouse could be made of thick, soft foam pieces for small children who would enjoy falling into the walls and seeing the house move. Stiff foam and other materials could be used for older children.

The components of the present invention can be injection molded. The outside surfaces of the structural members can have the shape of a train locomotive and cars, trucks, etc. The bottom base could have means for attaching wheels. Construction game puzzles are yet another use of this method of design and construction techniques. The bases can have groove patterns of any geometrical shape. Also the structural members could have no grooves at all. They could be like a cover or lid with a perimeter which fits on the outside of the structural members. Also, the base could be flat with a center section that fits inside the structural members.

Some or all of the grooves in the structural members may, in some instances, be V-shaped. This shape is self centering and helps in locating the grooves. All the grooves could be V-shaped or any other of many possible shapes. All sharp edges can be rounded for ease of assembly. There are applications when tables or other objects need to be moved on smooth floors, or kept off of delicate surfaces. In such cases, bottom members 140, 142 or 144 (see FIGS. 12-17) can be applied to the bottom or feet of the object to be moved to protect the surface.

Figure 68:
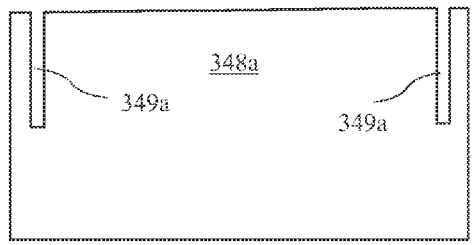
FIG. 68 shows a first structural member according to the present invention.

FIG. 68 shows a first structural member 348a. The structural member 348a includes two upward facing slots 349a.

Figure 69:
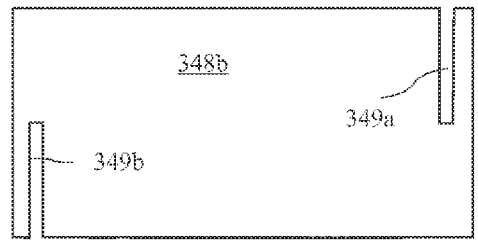
FIG. 69 shows a second structural member according to the present invention.

FIG. 69 shows a second structural member 348b. The structural member 348b includes a downward facing slot 349b and an upward facing slot 149a.

Figure 70:
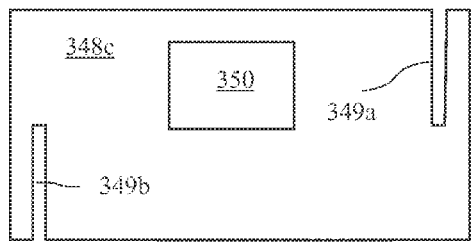
FIG. 70 shows a third structural member according to the present invention.

FIG. 70 shows a third structural member 348c. The structural member 349c includes an upward facing slot 348a, a downward facing slot 349b, and a window 350.

Figure 71:
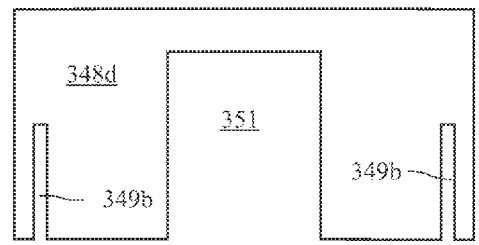
FIG. 71 shows a fourth structural member according to the present invention.

FIG. 71 shows a fourth structural member 349d. The structural member 348d includes two downward facing slots 349b and a doorway 351.

Figure 72:
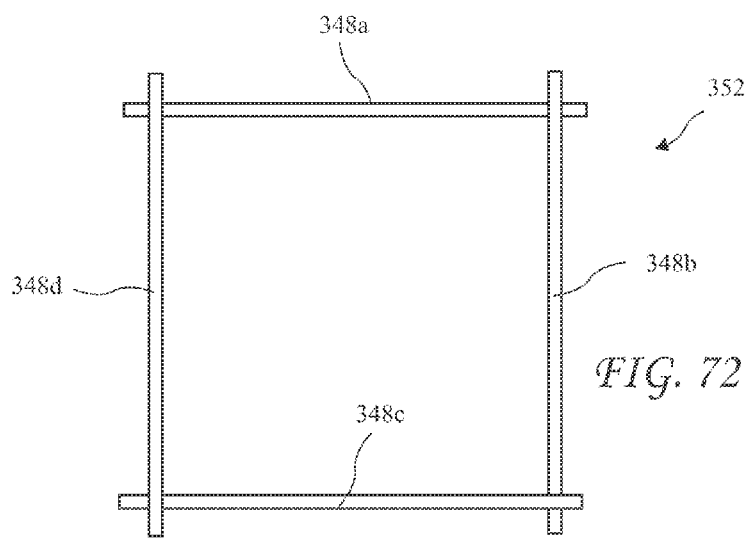
FIG. 72 shows a top view of a structure according to the present invention constructed from the first, second, third, and fourth structural members.

FIG. 72 shows a top view of a structure 352 constructed from the first, second, third, and fourth structural members 348a, 348b, 348c, and 348d. The slots 349a and 349b are constructed with edges 90 degrees from the extend of the structural members resulting the connected structural members being generally at 90 degree angles. Such 90 degree angles are not necessary qualities of the present invention, and the slots 349a and 349b may be at other angles, for example 60 degrees, to construct a hexagonal structure, and such construction is intended to come within the scope of the present invention.

Figure 73:
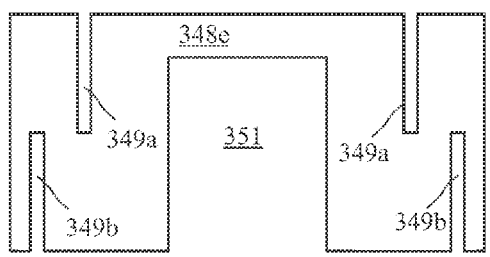
FIG. 73 shows an alternative fourth structural member according to the present invention.

FIG. 73 shows an alternative fourth structural member 348e. The structural member 348e additionally includes two upward facing slots 349a.

Figure 74:
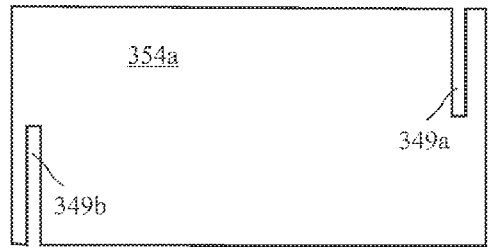
FIG. 74 shows a fifth structural member according to the present invention.

FIG. 74 shows a fifth structural member 354a. The structural member 354a includes a downward facing slot 349b and an upward facing slot 349a.

Figure 75:
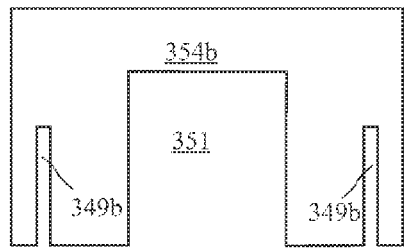
FIG. 75 shows a sixth structural member according to the present invention.

FIG. 75 shows a sixth structural member 354b. The structural member 354b includes two downward facing slots 349b and a doorway 351.

Figure 76:
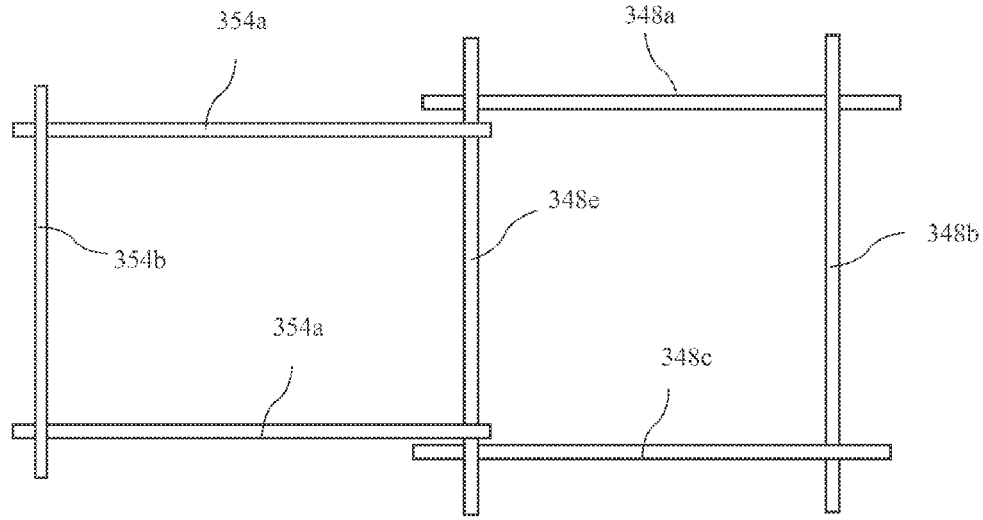
FIG. 76 shows a top view of a structure according to the present invention constructed from the first, second, third, alternative fourth, fifth, and sixth structural members.

FIG. 76 shows a top view of a structure 356 constructed from the first, second, third structural members 348a, 348b, and 348c, the alternative fourth structural members 348e, two of the fifth structural members 354a, and the sixth structural member 354b. Additional rooms may be similarly added to the structure 356 by providing two additional upward facing slots 349a. The structure 356 is constructed by adding the two fifth structural members 354a to the stable structure 352, and then adding the sixth structural member 354b.

Figure 77C:
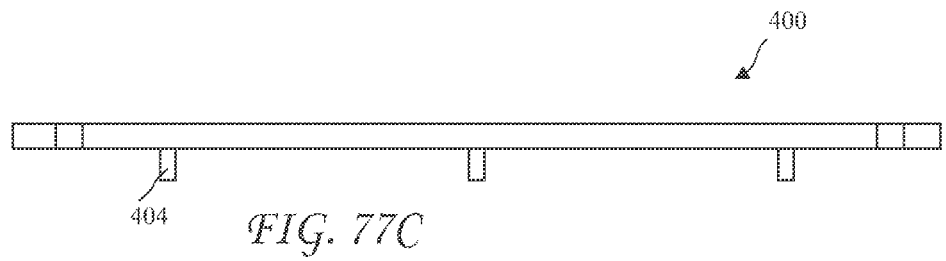
FIG. 77C shows a top view of the second structural member including the spacers according to the present invention.
Figures 77A, 77B:
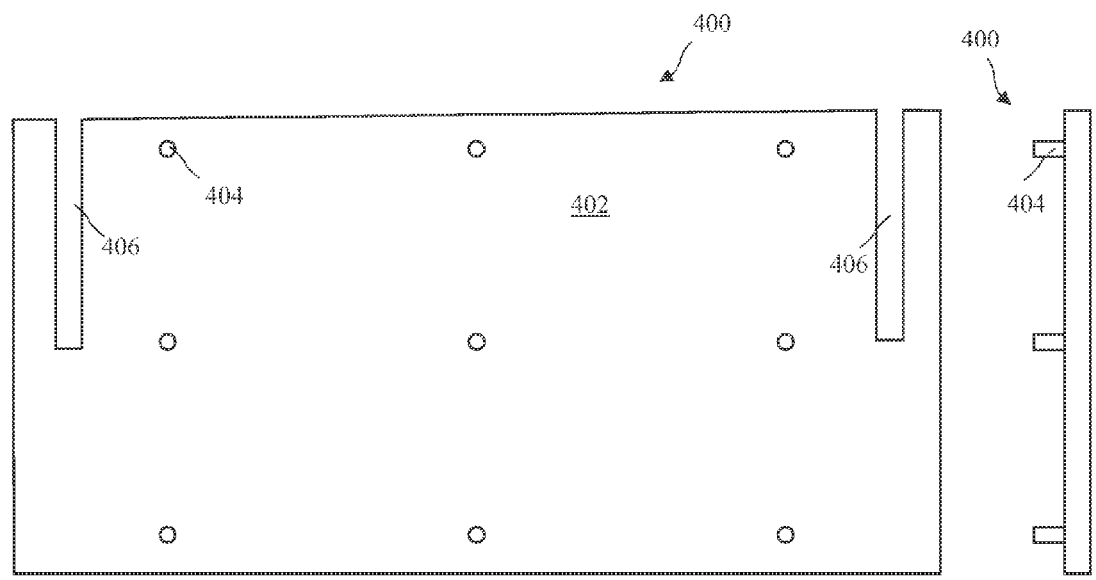
FIG. 77A shows an inside view of a second structural member including spacers according to the present invention.
FIG. 77B shows a side view of the second structural member including the spacers according to the present invention.

FIG. 77A shows an inside view of a second structural member 400 including spacers 404 according to the present invention, FIG. 77B shows a side view of the structural member 400, and FIG. 77C shows a top view of the structural member 400. The structural member 400 is shown with two upward facing slots 406, but may have two downward facing slots as shown in FIG. 75, or one upward and one downward facing slot as shown in FIG. 74. The structural member 400 may further include a doorway 351 or a window opening 350, or both a doorway and window opening. A number of the spacers 404 are vertically and horizontally spaced apart and preferably permanently attached on the inside surface of the structural member 400.

Figure 78:
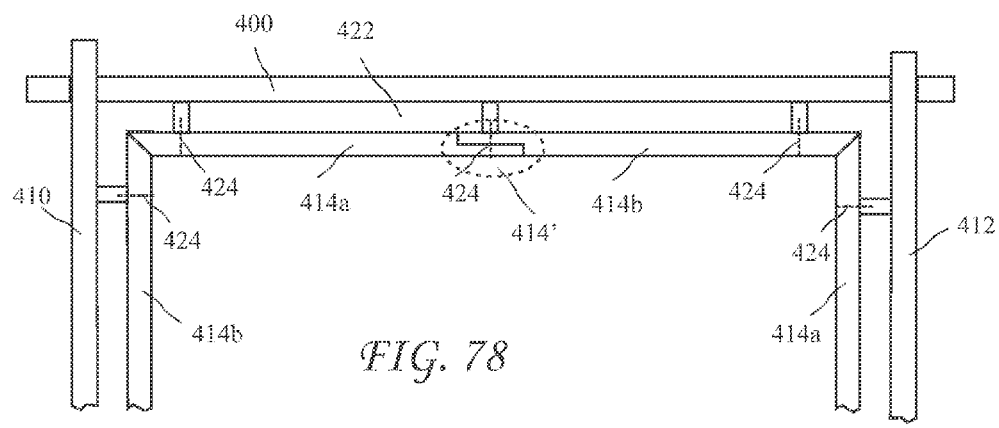
FIG. 78 shows a top view of the second structural member having inner panels attached to the spacers according to the present invention.

FIG. 78 shows a top view of the structural member 400 having inner panels 414a and 414b attached to the spacers 404. The spacers 404 are preferably between two and six inches long, and more preferably about four inches long and provide a space 422 between the structural member 400 and the inner panels 414a and 414b. The space 422 is provided for insulation, electrical, and plumbing. The inner panels 414a and 414b may be attached to the spacers by bolts, screws, adhesive, and the like, and are preferably attached by screws 424. For easy installation, the inner panels 414a and 414b may overlap at 414' and single fasteners 424 may reach through overlapped portions of through both inner panels 414a and 414b.

Figure 79:
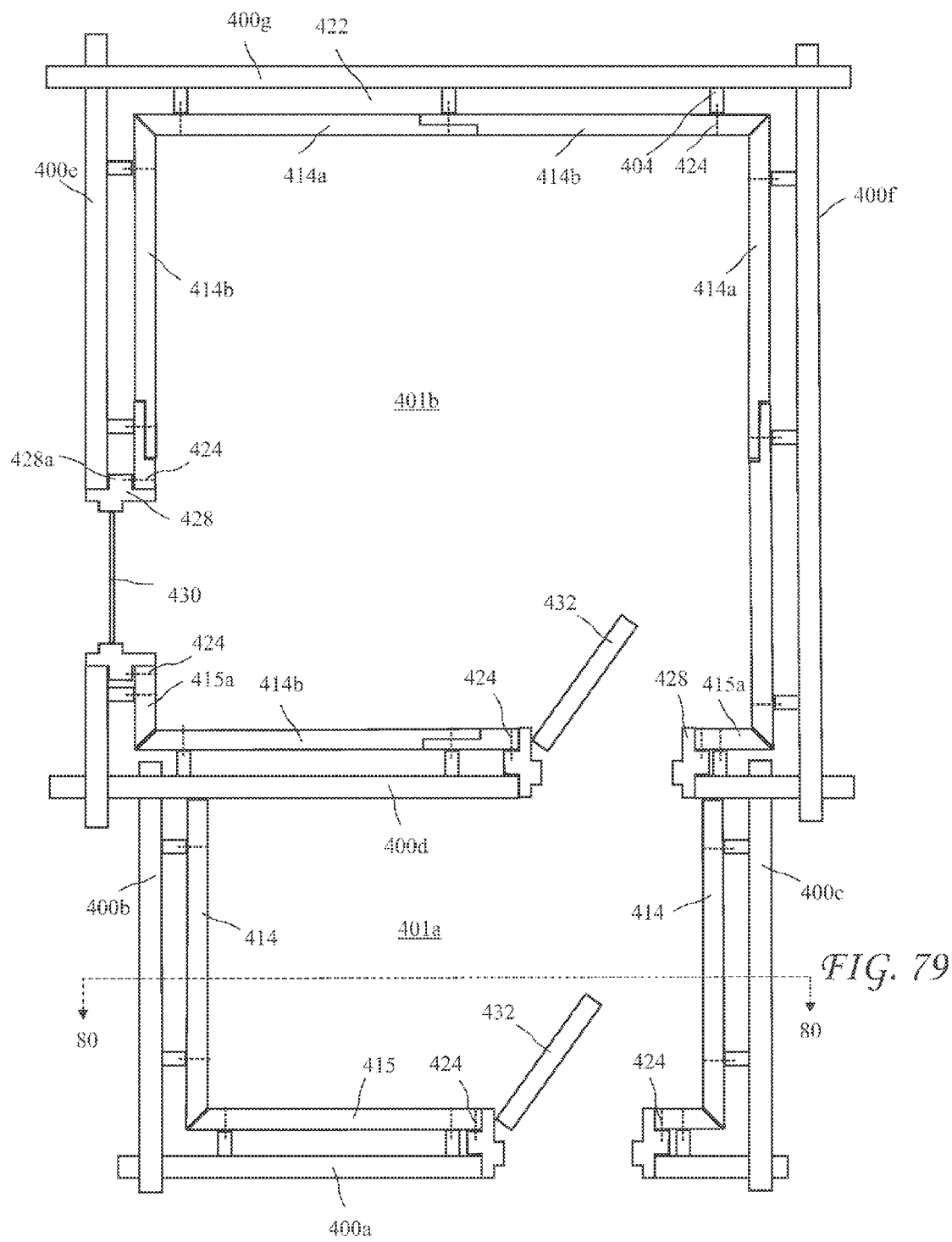
FIG. 79 shows a top view of a two room structure constructed using the second structural members and inner panels according to the present invention.

FIG. 79 shows a top view of a two room structure constructed using the second structural members and inner panels having interiors 401a and 401b. The structural members are selected to allow easy assembly by a single adult. For example, a first structural member 400a having two upward facing slots 406 is positioned and may be braced as necessary. Next the structural members 400b and 400c, each having one downward facing slot to engage the structural member 400a are positioned above, and then lowered to engage the downward facing slots with the upward facing slots in the structural member 400a, providing a stable structure to add. Next, a structural member 400d having two downward facing slots, having the same lateral spacing as the upward facing slots of the structural member 400a, and two upward facing slots outside the upward facing slots (e.g., see FIG. 73), is raised above and lowered to engage the structural members 400b and 400c.

The second room is added by sequentially adding structural members 400e and 400f, followed by the last structural member 400g. In each instance, the structural members are added by engaging a downward facing slot in the added panel with an upward facing slot in the previously added panel(s).

Either during or after completing the assembly of the structural members, interior panels may be added. The interior panels may be a single panel 414, or a pair of overlapping panels 414a and 414b, based on the width of the wall the interior panels are forming, and the builder's preference. The inner panels include door 432 and window 430 openings aligned with the openings in the structural members.

FIG. 80 shows a cross-sectional view of one room of the structure constructed using the structural members 400 and inner panels 414 taken along line 80-80 of FIG. 79. Door and window casings 428 and 429 are attached to the structural members and inner panels on both sides and top respectively of the door openings and on all four sides of the window openings. The casings 428 preferably include extensions 428a reaching in the space 422 between the structural members and interior panels to position the casings 428, and to allow fasteners 424 to easily attach the casings 428 to the structural members and/or inner panels. Tops of the inner panels are a distance D below tops of the structural members.

FIG. 81A shows a bottom view of a grooved roof panel 440 for use with the structure constructed using the second structural members and inner panels, FIG. 81B shows a side edge view of the grooved roof panel, and FIG. 81C shows a front edge view of the grooved roof panel. The roof panel 440 includes grooves 442 aligned with the structural members. The grooves are the distance D deep, and allow the roof panel 440 to rest on the structural members with the structural members reaching fully into the grooves 442, and the inner panels butting against the roof panel 440. The roof panel 440 may be a single panel covering one or more room constructed using the structural members, or two or more panels may be combined to cover one or more room.

Figures 82, 82A:
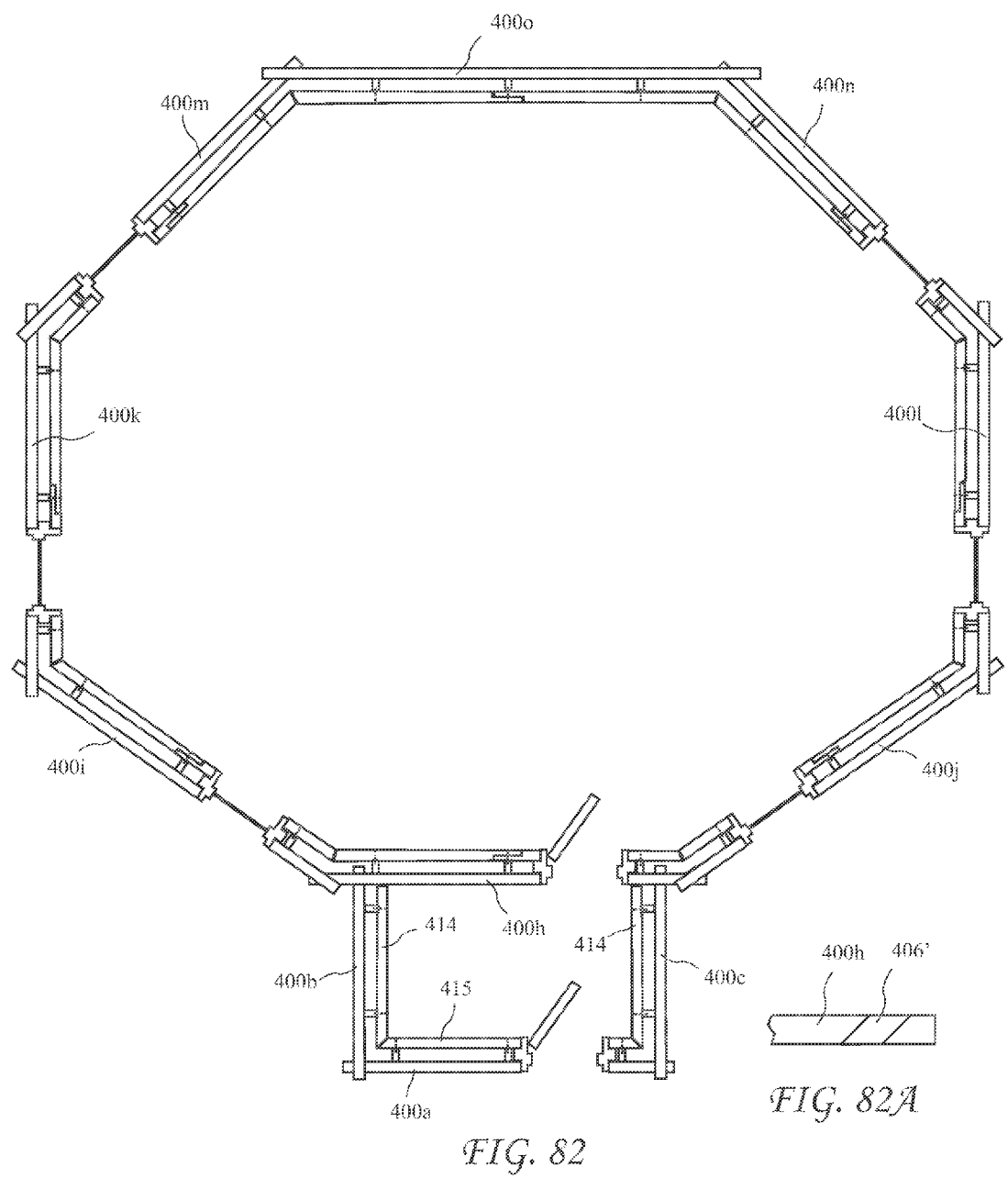
FIG. 82 shows a top view of a two room structure constructed using the second structural members and inner panels, and including an octagonal room, according to the present invention.
FIG. 82A shows a panel with an angled slot according to the present invention.

FIG. 82 shows a top view of a two room structure constructed using the second structural members and inner panels, and including an octagonal room. The smaller rectangular room is constructed as described in FIG. 79. The large octagonal room is constructed in the order of structural members 400h, 400i, 400j, 400k, 400l, 400m, 400n, and finally 400o, although either left side (400i, 400k, and 400m), or the right side (400j, 400l, and 400n) may be independently assembled in order, with the structural member 400o add last. The inner panels are similarly assembled as described in FIG. 79. The slots in the structural members are angled as necessary, for example, the slot 406' in the panel 400h is angled 45 degrees as show in FIG. 82a.

Figure 83:
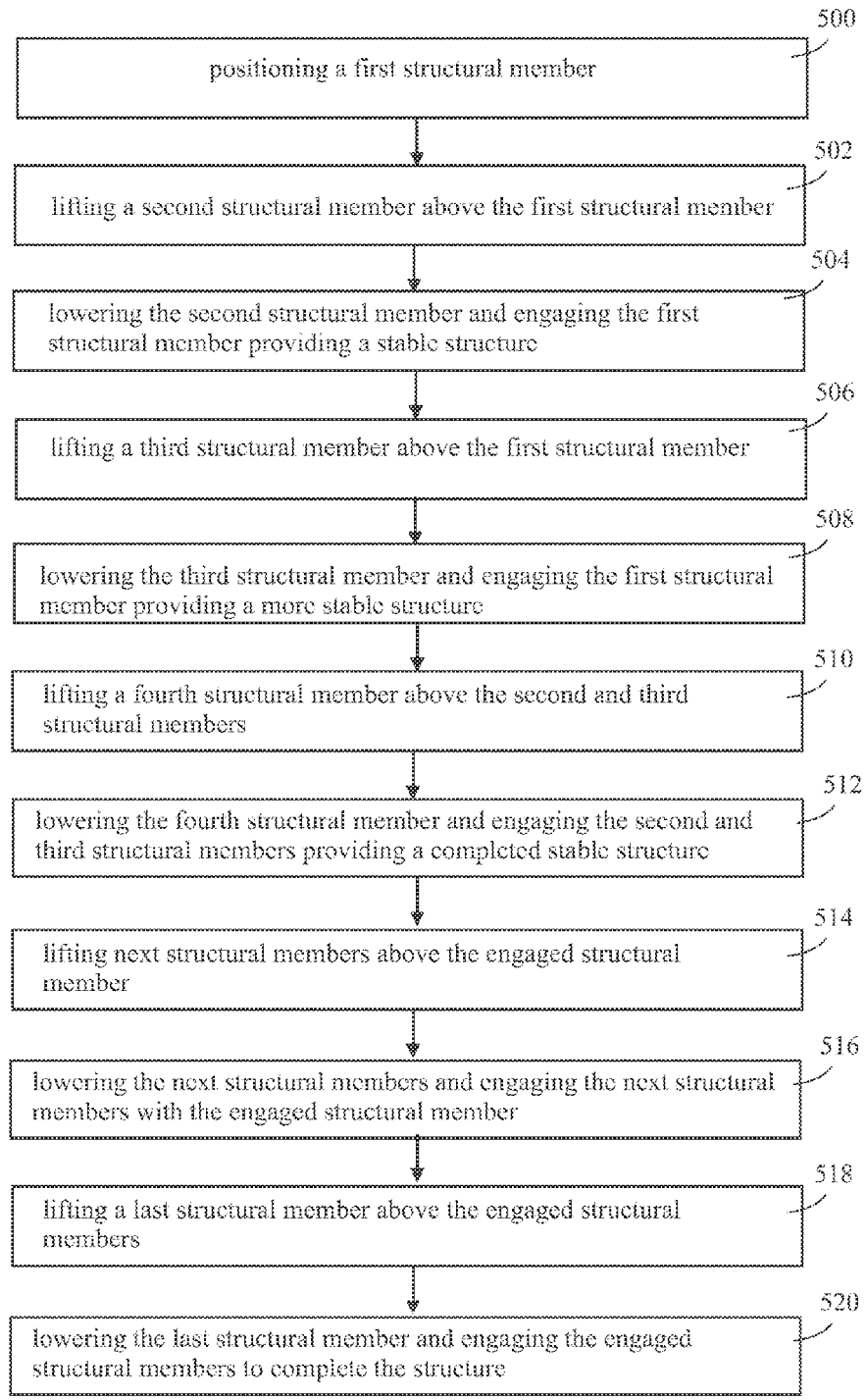
FIG. 83 shows a method for assembling structural members according to the present invention.

FIG. 83 shows a method for assembling structural members 400 according to the present invention. The particular arrangement of the slots 406 allow a single individual, or even a child, to construct the structure because connecting the structure members provides a stable construction which the structure members are subsequently added to. The structure members and methods of the present invention may be applied to various full size and miniature structures.

The method includes:

positioning a first structural member at step 500, which includes positioning the first structural member having vertically side by side first and second parallel slots with the first and second parallel slots facing upward;

lifting a second structural member above the first structural member at step 502, which includes lifting a second structural member having vertically offset third and fourth parallel slots above the first structural member with the third slot facing downward;

lowering the second structural member and engaging the second structural member providing a stable structure at step 504, which includes lowering the second structural member and engaging the third slot of the second structural member with the second slot of the first structural member providing a stable structure;

lifting a third structural member above the first structural member at step 506, which includes lifting a third structural member having vertically offset fifth and sixth parallel slots above the first structural member with the fifth slot facing downward;

lowering the third structural member and engaging the first structural member providing a more stable structure at step 508, which includes lowering the third structural member and engaging the fifth slot of the third structural member with the second slot of the first structural member providing a more stable structure;

lifting a fourth structural member above the second and third structural members at step 510, which includes lifting a fourth structural member having vertically side by side seventh and eighth parallel slots above the second and third structural members with the seventh and eighth slots facing downward; and lowering the fourth structural member and engaging the fourth structural member with the second and third fourth structural members providing a completed stable structure at step 512, which includes lowering the fourth structural member and at the same time, comprising:

engaging the seventh slot of the fourth structural member with the fourth slot of the second structural member; and engaging the eighth slot of the fourth structural member with the sixth slot of the third structural member providing a completed stable structure.

A second room may be added to the stable structure following the steps:

lifting next structural members above the engaged structural member at step 514;

lowering the next structural members and engaging the next structural members with the engaged structural member at step 516;

lifting a last structural member above the engaged structural members at step 518; and lowering the last structural member and engaging the engaged structural members to complete the structure at step 520.

FIG. 83 describes one set of steps for assembly of a structure. The present invention recognizes the general concept of positioning a first panel with two upward facing slots, and attaching additional panels with one upward and one downward facing slot, and a final panel with two downward facing slots. Such methods establish a stable structure from the attachment of the first and second panel, and allow construction of more complex structures by adding panels to the initial stable structure.

Additionally, the structures may be assembled on a notched base 330, 332, and 331 (see FIG. 61) and the structure members 348*a*-348*e* and 354*a* and 354*b* may further include the locking curved areas and raised areas shown in FIG. 63.

Figure 84:
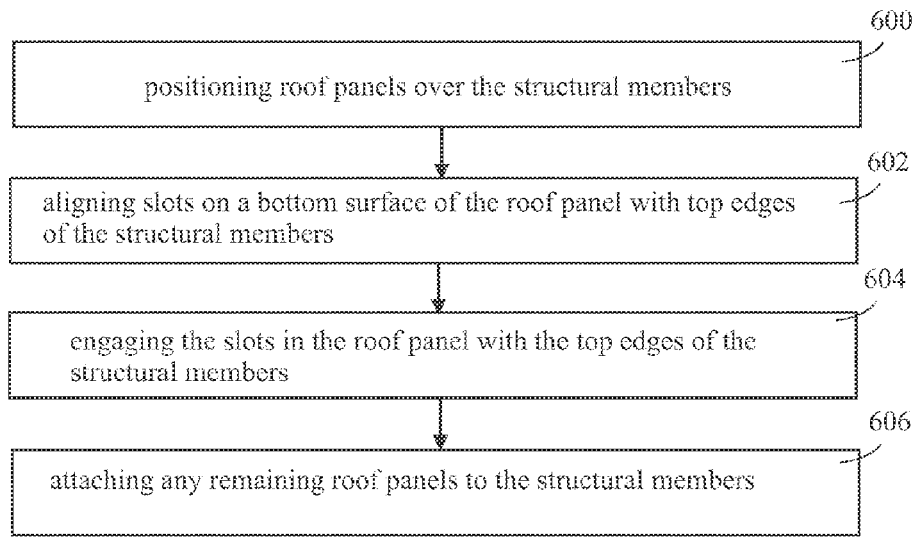
FIG. 84 shows a method for attaching a roof panel to an assembled structure according to the present invention.

FIG. 84 shows a method for attaching a roof panel to an assembled structure according to the present invention. The method includes positioning roof panels over the structural members at step 600, aligning slots on a bottom surface of the roof panel with top edges of the structural members at step 602, engaging the slots in the roof panel with the top edges of the structural members at step 604, and attaching any remaining roof panels to the structural members at step 606.

Figure 85:
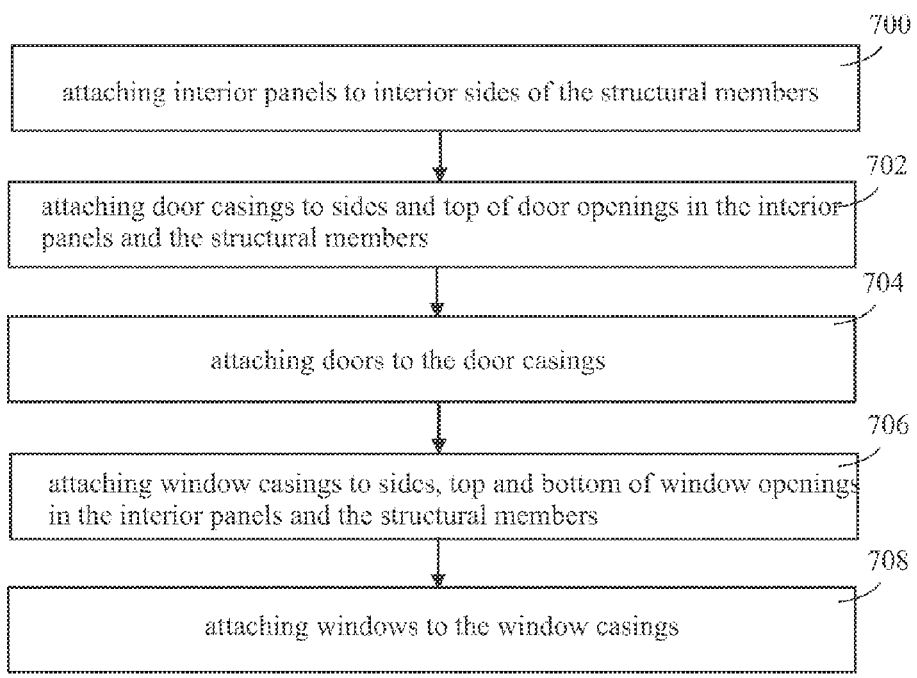
FIG. 85 shows a method for adding interior panels and doors and windows to an assembled structure according to the present invention.

FIG. 85 shows a method for adding interior panels, doors, and windows to a structure. The method includes attaching interior panels to interior sides of the structural members at step 700, attaching door casings to sides and top of door openings in the interior panels and the structural members at step 702, attaching doors to the door casing at step 704, attaching window casings to sides, top and bottom of window openings in the interior panels and the structural member at step 706, and attaching windows to the window casing at step 708. Preferably, attaching door and window casings includes inserting extensions reaching in the space 422 between the structural members and interior panels to position the casings and driving fasteners through the structural members and/or the interior panels and into the extensions.

While certain embodiments are described here, the construction according to the present invention can be used to make, for example, a loveseat or settee just by changing the physical dimensions of the parts of the chair structures described herein. Using the same process one can design a bed. These and other embodiments will be apparent to those skilled in the art and are intended to come within the scope of the present invention.

While the invention herein disclosed has been described by means of specific embodiments and applications thereof, numerous modifications and variations could be made thereto by those skilled in the art without departing from the scope of the invention set forth in the claims.

I claim:

1. A method for sequentially interconnecting structural members in rigid alignment to construct a stable structure, the method comprising:

positioning a first structural member having vertically side by side first and second parallel slots and a multiplicity of vertically and horizontally spaced apart spacers on an inside surface, with the first and second parallel slots facing upward and the spacers extending towards an interior of the stable structure;

lifting a second structural member having vertically offset third and fourth parallel slots and the multiplicity of spacers above the first structural member, with the third slot facing downward and the spacers extending towards the interior of the stable structure;

lowering the second structural member and engaging the third slot of the second structural member with the first slot of the first structural member providing a stable structure;

lifting an additional structural member having vertically offset downward and upward facing parallel slots, and the multiplicity of spacers, above one of the engaged structural members having an open upward facing slot, with the downward facing slot of the additional structural member aligned with the open upward facing slot of the engaged structural member, and the spacers extending towards the interior of the stable structure;

lowering the additional structural member and engaging the downward facing slot of the additional structural member with the open upward facing slot of the engaged structural member, providing a more stable structure;

engaging additional structural members with the engaged structural members until only a single final structure member remains unengaged;

completing a first room of the stable structure by lifting the final structural member having vertically side by side downward facing parallel slots, above two of the engaged structural members having open upward facing slots;

lowering the final structural member, and engaging each of the downward facing slots of the final structural member with the open upward facing slots of the engaged structural members; and attaching inner panels to the spacers to provide an interior wall for the stable structure.

2. The method of claim 1, further including constructing a second room of the stable structure, wherein one of the engaged structural members of the first room includes two additional upward facing slots remaining open, and further including:

lifting a first additional structural member having vertically offset downward and upward facing parallel slots, and the multiplicity of spacers, above the engaged structural member having the two additional open upward facing slots, with the downward facing slot of the additional structural member aligned with one of the open upward facing slot of the engaged structural member, and the spacers extending towards the interior of the second room of the stable structure;

lifting a further additional structural member having vertically offset downward and upward facing parallel slots, and the multiplicity of spacers, above one of the engaged structural members having an open upward facing slot, with the downward facing slot of the further additional structural member aligned with one of the open upward facing slots of the engaged structural members, and the spacers extending towards the interior of the second room of the stable structure;

lowering the further additional structural member and engaging the downward facing slot of the further additional structural member with the open upward facing slot of the engaged structural member, providing a more stable structure;

engaging further additional structural members with the engaged structural members until only a second single final structure member remains unengaged;

completing a first room of the stable structure by lifting the second final structural member having vertically side by side downward facing parallel slots, above two of the engaged structural members having open upward facing slots;

lowering the second final structural member, and engaging each of the downward facing slots of the second final structural member with the open upward facing slots of the engaged structural members; and attaching inner panels to the spacers to provide an interior wall for the second room of the stable structure.

3. The method of claim 1, further including installing fasteners through the inner panels and into the spacers to attached the inner panels to the structural members.

4. The method of claim 1, further including: positioning a base on the area of the structure assembly, the base including upward facing grooves; and positioning the structural members into the grooves.

5. The method of claim 4, further including positioning a roof structure over the structural members.

6. The method of claim 5, wherein the roof structure includes downward facing roof grooves and further including engaging the downward facing roof grooves of the roof structure with the structural members.

7. The method of claim 6, wherein the roof structure includes upward facing roof grooves opposite the downward facing roof grooves, and further including: assembling a second story of the including engaging structural members of the second story with the upward facing roof grooves.

8. The method of claim 1, wherein at least one of the structural members and corresponding inner panels includes an opening for a door.

9. The method of claim 8, wherein at least one of the structural members and corresponding inner panels includes an opening for a window.

10. The method of claim 8, wherein the opening for the door includes door casing on side and a top of the door opening.

11. The method of claim 8, wherein the door casing includes an extension, the method further including inserting the door casing extension into a space between the structural member and the inner panel.

12. The method of claim 11, further including installing fasteners through at least of the structural member and the inner panel and into the door casing extensions to attached the door casing extensions.

13. The method of claim 1, wherein attaching inner panels to the spacers to provide an interior wall for the stable structure includes creating spaces between the structural members and the inner panels.

14. The method of claim 13, further including installing electrical connections in the spaces between the structural members and the inner panels.

15. The method of claim 13, further including installing plumbing in the spaces between the structural members and the inner panels.

16. A method for sequentially interconnecting structural members in rigid alignment to construct a stable structure, the method comprising:

positioning a first structural member having vertically side by side first and second parallel slots and a multiplicity of vertically and horizontally spaced apart spacers on an inside surface, with the first and second parallel slots facing upward and the spacers extending towards an interior of the stable structure;

lifting a second structural member having vertically offset third and fourth parallel slots and the multiplicity of spacers above the first structural member, with the third slot facing downward and the spacers extending towards the interior of the stable structure;

lowering the second structural member and engaging the third slot of the second structural member with the first slot of the first structural member providing a stable structure;

lifting an additional structural member having vertically offset downward and upward facing parallel slots, and the multiplicity of spacers, above one of the engaged structural members having an open upward facing slot, with the downward facing slot of the additional structural member aligned with the open upward facing slot of the engaged structural member, and the spacers extending towards the interior of the stable structure;

lowering the additional structural member and engaging the downward facing slot of the additional structural member with the open upward facing slot of the engaged structural member, providing a more stable structure;

engaging additional structural members with the engaged structural members until only a single final structure member remains unengaged;

completing a first room of the stable structure by lifting the final structural member having vertically side by side downward facing parallel slots, above two of the engaged structural members having open upward facing slots;

lowering the final structural member, and engaging each of the downward facing slots of the final structural member with the open upward facing slots of the engaged structural members;

constructing a second room of the stable structure, wherein one of the engaged structural members of the first room includes two additional upward facing slots remaining open;

lifting a first additional structural member having vertically offset downward and upward facing parallel slots, and the multiplicity of spacers, above the engaged structural member having the two additional open upward facing slots, with the downward facing slot of the additional structural member aligned with one of the open upward facing slot of the engaged structural member, and the spacers extending towards the interior of the second room of the stable structure;

lifting a further additional structural member having vertically offset downward and upward facing parallel slots, and the multiplicity of spacers, above one of the engaged structural members having an open upward facing slot, with the downward facing slot of the further additional structural member aligned with one of the open upward facing slots of the engaged structural members, and the spacers extending towards the interior of the second room of the stable structure;

lowering the further additional structural member and engaging the downward facing slot of the further additional structural member with the open upward facing slot of the engaged structural member, providing a more stable structure;

engaging further additional structural members with the engaged structural members until only a second single final structure member remains unengaged;

completing a first room of the stable structure by lifting the second final structural member having vertically side by side downward facing parallel slots, above two of the engaged structural members having open upward facing slots;

lowering the second final structural member, and engaging each of the downward facing slots of the second final structural member with the open upward facing slots of the engaged structural members; and attaching the inner panels and into the spacers to provide an interior wall for the stable structure.

17. A method for sequentially interconnecting structural members in rigid alignment to construct a stable structure, the method comprising:

positioning a first structural member having vertically side by side first and second parallel slots and a multiplicity of vertically and horizontally spaced apart spacers on an inside surface, with the first and second parallel slots facing upward and the spacers extending towards an interior of the stable structure;

lifting a second structural member having vertically offset third and fourth parallel slots and the multiplicity of spacers above the first structural member, with the third slot facing downward and the spacers extending towards the interior of the stable structure;

lowering the second structural member and engaging the third slot of the second structural member with the first slot of the first structural member providing a stable structure;

lifting an additional structural member having vertically offset downward and upward facing parallel slots, and the multiplicity of spacers, above one of the engaged structural members having an open upward facing slot, with the downward facing slot of the additional structural member aligned with the open upward facing slot of the engaged structural member, and the spacers extending towards the interior of the stable structure;

lowering the additional structural member and engaging the downward facing slot of the additional structural member with the open upward facing slot of the engaged structural member, providing a more stable structure;

engaging additional structural members with the engaged structural members until only a single final structure member remains unengaged;

completing a first room of the stable structure by lifting the final structural member having vertically side by side downward facing parallel slots, above two of the engaged structural members having open upward facing slots;

lowering the final structural member, and engaging each of the downward facing slots of the final structural member with the open upward facing slots of the engaged structural members;

constructing a second room of the stable structure, wherein one of the engaged structural members of the first room includes two additional upward facing slots remaining open and a first door opening, wherein at least one additional structural member forming the first room includes a second door opening;

lifting a first additional structural member having vertically offset downward and upward facing parallel slots, and the multiplicity of spacers, above the engaged structural member having the two additional open upward facing slots, with the downward facing slot of the additional structural member aligned with one of the open upward facing slot of the engaged structural member, and the spacers extending towards the interior of the second room of the stable structure;

lifting a further additional structural member having vertically offset downward and upward facing parallel slots, and the multiplicity of spacers, above one of the engaged structural members having an open upward facing slot, with the downward facing slot of the further additional structural member aligned with one of the open upward facing slots of the engaged structural members, and the spacers extending towards the interior of the second room of the stable structure;

lowering the further additional structural member and engaging the downward facing slot of the further additional structural member with the open upward facing slot of the engaged structural member, providing a more stable structure;

engaging further additional structural members with the engaged structural members until only a second single final structure member remains unengaged;

completing a first room of the stable structure by lifting the second final structural member having vertically side by side downward facing parallel slots, above two of the engaged structural members having open upward facing slots;

lowering the second final structural member, and engaging each of the downward facing slots of the second final structural member with the open upward facing slots of the engaged structural members to complete the stable structure;

installing fasteners though the inner panels and into the spacers to provide an interior wall for the stable structure and a space between the inner panels and the structural members for installation of at least one of insulation, electrical connections, and plumbing; and framing the door openings with door casing on the sides and top;

inserting extensions of the door casings into the space between the structural members and the interior panels; and inserting fasteners through at least one of the structural members and the inner panels and into the door casing extensions to attach the door casing extensions to the stable structure.

\* \* \* \* \*